(12) United States Patent
Murata

(10) Patent No.: US 7,113,703 B2
(45) Date of Patent: Sep. 26, 2006

(54) OPTICAL TRANSMISSION SYSTEM AND OPTICAL TRANSMISSION DEVICE

(75) Inventor: Kazuhisa Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/615,978

(22) Filed: Jul. 10, 2003

(65) Prior Publication Data
US 2004/0096220 A1 May 20, 2004

Related U.S. Application Data

(62) Division of application No. 09/289,580, filed on Apr. 12, 1999, now Pat. No. 6,654,562.

(30) Foreign Application Priority Data
May 20, 1998 (JP) .................................. 10-138556

(51) Int. Cl.
*H04J 14/02* (2006.01)
(52) U.S. Cl. ............................ 398/79; 398/9; 370/347; 370/537
(58) Field of Classification Search ................ 398/122, 398/78, 1, 9, 91, 79; 370/537, 281, 319, 370/347, 470; 714/757, 767, 800
See application file for complete search history.

(56) References Cited

U.S. PATENT DOCUMENTS

| | | | |
|---|---|---|---|
| 5,018,142 A | 5/1991 | Simcoe et al. | |
| 5,745,532 A * | 4/1998 | Campana, Jr. | 375/347 |
| 5,784,184 A | 7/1998 | Alexander et al. | |
| 6,025,944 A | 2/2000 | Mendez et al. | |
| 6,088,351 A | 7/2000 | Jenkin et al. | |
| 6,181,450 B1 | 1/2001 | Dishman et al. | |
| 6,313,932 B1 | 11/2001 | Roberts et al. | |

FOREIGN PATENT DOCUMENTS

| | | |
|---|---|---|
| JP | 2-71626 | 3/1990 |
| JP | 6-29956 | 2/1994 |
| JP | 8-102710 | 4/1996 |
| JP | 9-18406 | 1/1997 |

* cited by examiner

*Primary Examiner*—David C. Payne
(74) *Attorney, Agent, or Firm*—Staas & Halsey LLP

(57) ABSTRACT

An optical transmission system and optical transmission devices in the optical transmission system that can achieve a high quality transmission using considerably simple arrangements are disclosed. At a transmitting-end optical transmission device, encoding means having n outputs, forms k data by aligning phases of data on k channels with each other and for generating (n−k) error correction bits for said k data and adding said (n−k) error correction bits to said k data, and wavelength-multiplexing means connected to the encoding means, converts both said k data and said (n−k) error correction bits to n optical signals having different wavelengths and for wavelength-multiplexing said n optical signals so as to be delivered to the optical transmission line. At a receiving-end optical transmission device, wavelength-demultiplexing means separates the wavelength-multiplexed optical signals from the optical transmission line into n optical signals, each corresponding to one of the different wavelengths, and decoding means connected to the wavelength-multiplexing means, generates k error corrected data by correcting error bits using the (n−k) error correction bits contained in said n separated optical signals.

12 Claims, 13 Drawing Sheets

OPTICAL TRANSMISSION SYSTEM AND OPTICAL TRANSMISSION DEVICE

This application is a divisional of application Ser. No. 09/289,580 filed Apr. 12, 1999, now U.S. Pat. No. 6,654,562.

BACKGROUND OF THE INVENTION

1. Field of the Invention

The present invention generally relates to an optical transmission system that can be applicable to a long distance, high capacity transmission.

The present invention also relates to optical transmission devices, such as a transmitter and a receiver for the optical transmission system.

Such types of high capacity transmission systems using optical signals have been developed and designed so as to be adapted to multimedia applications. Many TDM (Time Division Multiplexing) transmission systems or WDM (Wavelength Division Multiplexing) transmission systems have been known. Typically, those systems have been intended to efficiently make use of a transmission line. In these high capacity transmission systems, it is particularly demanded that a reliable transmission can be achieved.

Therefore, the present invention relates to, in particular, the optical transmission system that has their transmission reliability been improved and the optical transmission device used in this system.

2. Description of the Related Art

A conventional wavelength-multiplexing transmission system includes an optical transmitter 201, an optical transmission line 203 and an optical receiver 202, as schematically shown in FIG. 1, and the system is in conformity with SDH (Synchronous Digital Hierarchy) that is a set of international, digital transmission standards. The optical transmitter 201 has, for each of k channels $CH_i$ (i=1, ..., k), individually an SOH (Section Over Head) inserting unit 204 for inserting an SOH, an electrical-optical converter (OS) 205 and a wavelength-multiplexer 206. The optical receiver 202 also has, for each of the k channels, individually a wavelength-demultiplexer 207, an optical-electrical converter (OR) 208 and an SOH terminating unit 209.

The SOH inserting unit 204 at the optical transmitter 201 inserts the SOH into an electrical signal for one of the corresponding channels $CH_i$. Each electrical signal for the every channel is then provided to the optical-electrical converter 205 and converted to an optical signal with a wavelength $\lambda_i$ corresponding to the channel $CH_i$. The optical signals having the wavelength of $\lambda_i$ are multiplexed by the wavelength-multiplexer 206 and resulting wavelength-multiplexed signals are transmitted to the optical transmission line 203.

The wavelength demultiplexer 207 at the optical receiver 202 separates the multiplexed signals received from the optical transmitter 201 through the optical transmission line 203 into the signals corresponding to the wavelengths $\lambda_1$ to $\lambda_k$, respectively. These optical signals having the wavelength of $\lambda_1$ to $\lambda_k$, respectively, are converted to corresponding electrical signals by the optical-electrical converter 208, and then the SOH of the electrical signals is terminated by the SOH terminating unit 209. The electrical signals having their SOH terminated are transmitted to a further stage (not shown in FIG. 1) on an each i.e., (individual) channel basis. Thus, the data comprising the electrical signals for each of the channels $CH_1$ to $CH_k$ can be transmitted from the optical transmitter 201 to the optical receiver 202 over the signal optical transmission line 203.

Several error correction techniques have been also proposed in order to improve a transmission quality by correcting transmission errors involved in the transmitted data. For example, one of the known techniques, also called an "FEC (Forward Error Correction)" method, consists in generating and adding an error correction bit to the data representing one frame or the data of a predetermined length and performing the error correction at a receiver side.

Adding a parity bit to the transmitted data is also a common technique used for determining a presence/absence of the transmission error within the transmitted data. In this case, the SOH may be also provided with error monitoring bits, named B1 and B2.

The earlier described error correction techniques consist in, for every frame or every block of the transmission data, generating an error correction bit and adding it to each frame or block. Therefore, in contrast with a transmission system without correcting transmission errors, the conventional transmission system provided with the error correction technique has to increase a transmission rate, because a number of bits to be transmitted are increased. Alternatively, if the transmission rate is set to a predetermined value, the transmission system should reduce an amount of the transmission data so that the error correction bit can be transmitted together with the transmission data within the predetermined transmission rata.

Furthermore, in some of the conventional transmission systems, erroneous bits included in the transmission data cannot be corrected when parity bits are contained in the data. One solution for improving a capability of correcting the erroneous bits in the data is to increase the number of the error correction bits added to the transmission data. However, this solution may be not practical, because a considerably high transmission rate is required for increasing the number of error correcting redundant bits to be added to the transmission data.

Another possible solution is to insert the error correction bits into reserved bits within the SOH. The reserved bits means that those bits are reserved for a variety of future applications. In this case, since a lot of redundant bits are to be inserted into some particular locations in the SOH, a problem may occur that a size of a circuit comprising a transmission device, such as the transmitter 201 and the receiver 202, is enlarged. This solution has a further drawback in that the error correction bits, which have been already assigned to the reserved bits, cannot be made use of, if the reserved bits are decided to be used for one of the future appiications.

SUMMARY OF THE INVENTION

Accordingly, an object of the present invention is to provide an optical transmission system for allowing a high capacity and high quality transmission and which can be easily and simply manufactured or implemented.

Another object of the present invention is to provide an optical transmitter and an optical receiver suitable for used in the optical transmission system according to the present invention.

The object of the present invention is achieved by an optical transmission system which is operable to form a set of k data by aligning each of phases from k channels in phase, generate and add a set of (n–k) error correction bits to the set of k data so as to produce n data in total, convert the n data into different signals having different wavelengths $\lambda_1$ to $\lambda_n$, respectively, by an electrical-optical converter, multiplex these signals by an wavelength multiplexer, and send the multiplexed signals to an optical transmission line.

The inventive optical transmission system further operable to receive the multiplexed signals through the optical transmission line, separate the received multiplexed signals into signals having different wavelengths $\lambda_1$ to $\lambda_n$, respectively, by a wavelength demultiplexer, converts the signals having the different wavelengths $\lambda_1$ to $\lambda_n$, respectively, to electrical signals by an optical-electrical converter, and correct errors within the k data by means of the (n–k) error correction bits contained in the n data.

In the optical transmission system according to the present invention, the k data concurrently transmitted are added to in parallel by the (n–k) error correction bits. Then, the k data being added to by the error correction bits are converted to optical signals having the different wavelengths $\lambda_1$ to $\lambda_n$, respectively, so as to be transmitted as the wavelength-multiplexed optical signals. This allows the optical transmission system to correct the errors at a receiver and transmit data with the high quality without increasing the transmission rate. In addition, since the error correction bits are generated for the k data at the same timing, an error correction decoding process has to be performed at the receiver. To do this, a frame synchronous byte may be added to each of the k data, each data containing the error correction bits.

The object of the present invention can be achieved by a further optical transmission system which is operable to form a set of k data by aligning data from k channel $CH_1$ to $CH_k$ with each other, add an SOH containing error monitoring bytes B1 and B2 to the set of k data, generate and add a parity bit to the set of the k data so as to form a sequence of (k+1) data, convert the sequence of the (k+1) data to optical signals having different wavelengths, wavelength-multiplex the optical signals and send the multiplexed signals to an optical transmission line. At the receiver, after receiving the multiplexed signals through the optical transmission line, the received multiplexed signals are separated into signals corresponding to wavelengths, respectively, and then the separated signals are converted to electrical signals. Subsequently, a parity check is performed on the basis of a sequence of (k+1) data from the electrical signals, and another parity check corresponding to channels $CH_1$ to $CH_k$ is carried out by means of an error check byte within the SOH. In this case, depending on results of the parity checks, a position of the error bit is located and the error bit may be corrected. Thus, the error correction can be achieved solely by additionally assigning the parity bit corresponding to a vertical parity to the data.

The object of the present invention can be achieved by a still further optical transmission system for serially transmitting data such as TDM (Time-Division Multiplexing) transmission data. The optical transmission system is operable to generate and add a set of (n–k) error correction bits to k bits of the transmission data, convert the k bits of the transmission data and the (n–k) error correction bits to different optical signals having different wavelengths, and the optical signals are multiplexed so as to be transmitted as wavelength-multiplexed signals through an optical transmission line. The optical transmission system further receives the wavelength-multiplexed signals through the optical transmission line, separates the received multiplexed signals into different signals having corresponding wavelengths, and perform error correction decoding process for the n bits corresponding to the transmission data by means of the (n–k) error correction bits. That is to say, in this case, for a serial data of the k bits, the (n–k) error correction bits are converted into the signals having the different wavelengths such that the serial data of k bits can be transmitted in parallel.

The object of the present invention can be achieved by a still further optical transmission system for transmitting data through k channels. The optical transmission system, at a transmitter, generates and adds (n–k) error correction bits to k data present at the same timing so as to form a sequence of n data, multiplexes the sequence of the n data, converts the multiplexed data to optical signals and sends the optical signals to an optical line. The optical transmission system, at a receiver, receives the optical signals through the optical line, converts the received optical signals to electrical signals, separates the electrical signals into a sequence of n data and performs an error correction decoding on the k data from the sequence of the n data by means of the (n–k) error correction bits. In this case, if a plurality of reserved channels exist in the channels available in a TDM (Time Division Multiplexing) transmission, the reserved channels can be assigned to the error correction bits. Alternatively, if a number of the error correction bits assigned to busy channels is more than that of the reserved channels, an error correction coding is performed only on some significant channels from the busy channels. It leads to that the number of the error correction bits within an error correction code is limited by the number of the reserved channels and the data transmitted through the significant channels can be transmitted using the error correction coding.

Other objects and further features of the present invention will be apparent from the following detailed description when read in conjunction with the accompanying drawings.

DETAILED DESCRIPTION OF THE PREFERRED EMBODIMENTS

In the following, principles and embodiments of the present invention will be described with reference to the accompanying drawings.

Figure 1:
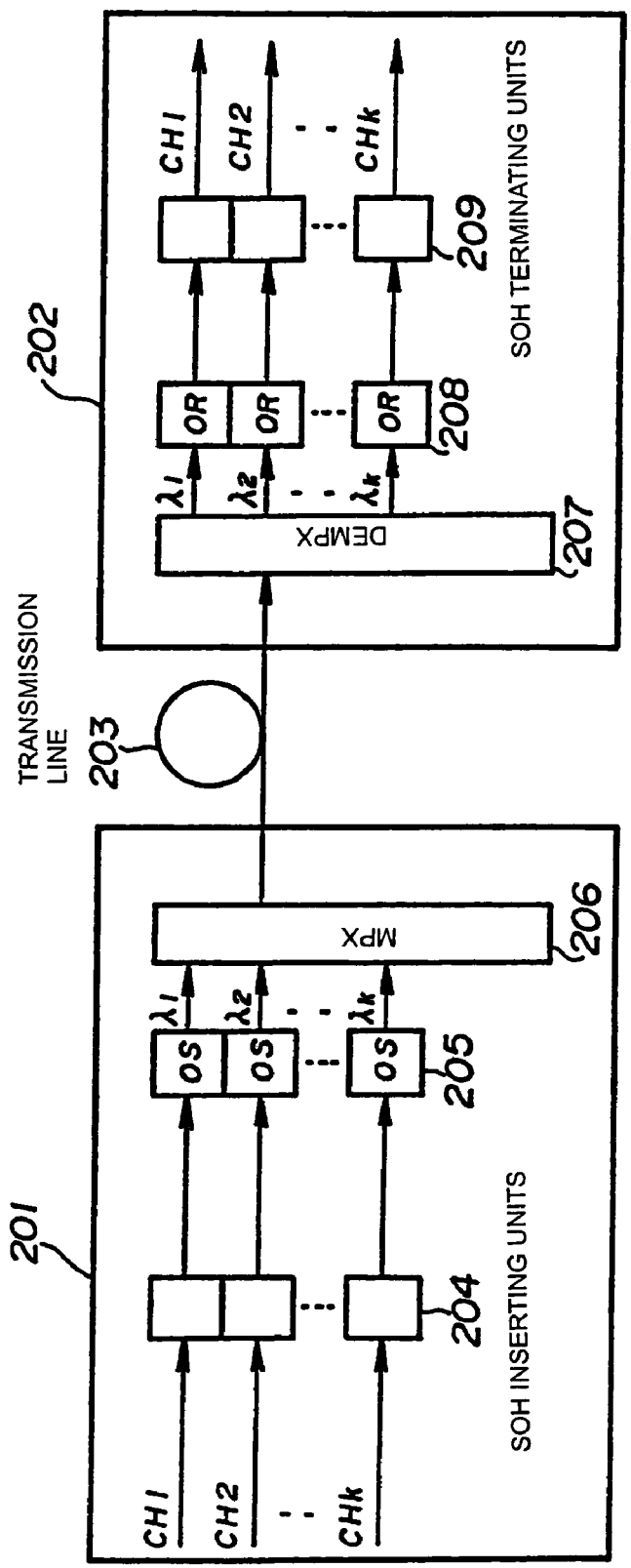
FIG. 1 is a schematic diagram of a wavelength multiplexing transmission system in the prior art.
Figure 2:
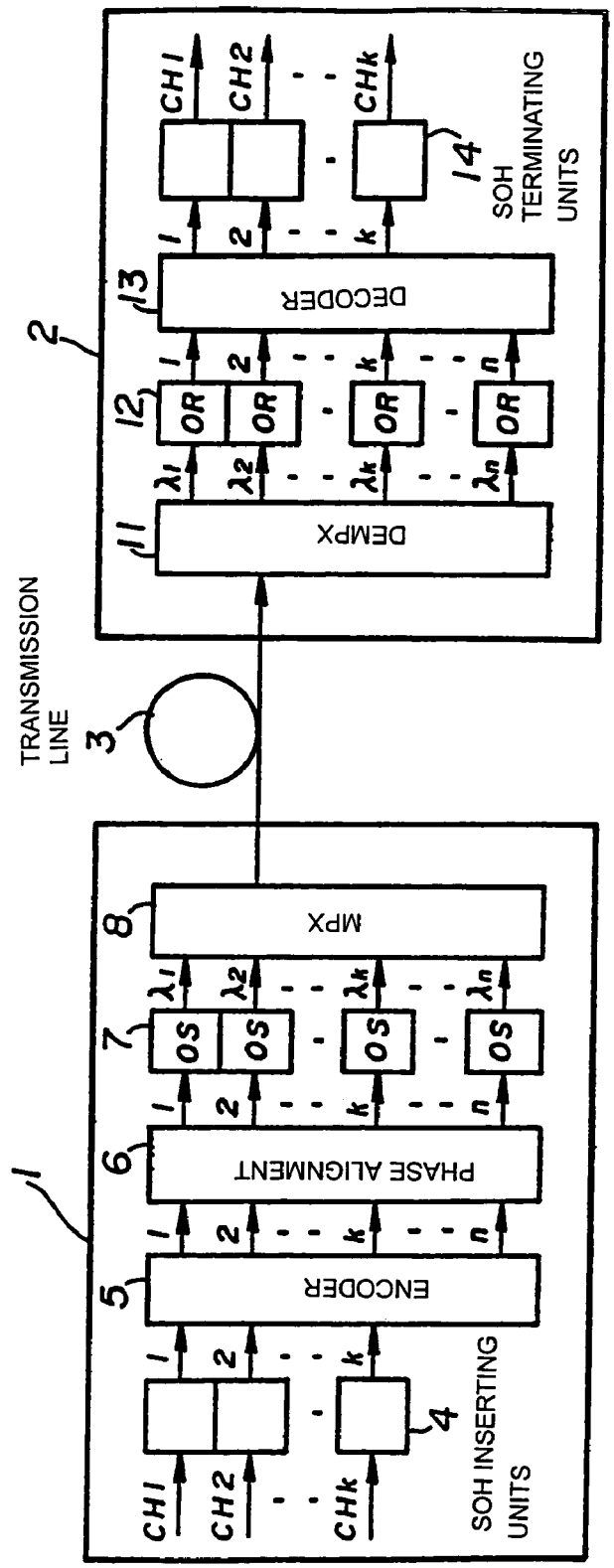
FIG. 2 is a schematic diagram of a first embodiment of an optical transmission system according to the present invention.

FIG. 2 shows a first embodiment of an optical transmission system according to the present invention. As shown in FIG. 2, the optical transmission system comprises an optical transmission device 1 provided at a transmitting side, an optical transmission device 2 provided at a receiving side and an optical transmission line connecting the optical transmission device 1 and the optical transmission device 2. Hereinafter, the optical transmission device 1 provided at the transmitting side is assumed to be a transmitting-end station and the optical transmission device 2 provided at the receiving side is a receiving-end station.

The optical transmission system further comprises an SOH inserting unit 4, an encoder 5, a phase alignment unit 6, an electrical-optical converter (OS) 7, a wavelength-multiplexing unit 8, a wavelength-demultiplexing unit 11, an optical-electrical converter (OR) 12, a decoder 13 and an SOH terminating unit. These elements are included in either the transmitting-end station 1 or the receiving-end station 2, as described hereinafter. In this embodiment, transmission data are transmitted using both of SDH (Synchronous Data Hierarchy) and WDM (Wavelength Division Multiplexing) methods.

The transmitting-end station 1 includes the SOH inserting unit 4 that adds an individual SOH (Section Over Head) to each transmission data coming from k channels $CH_1$ to $CH_k$ and the encoder 5 for error correction coding. For example, the encoder 5 may be such that the encoder 5 performs an operation of (n, k) Hamming coding. In this embodiment, the encoder 5 generates (n–k) error correction bits for k bits corresponding to k data present at the same timing from the channels $CH_1$ to $CH_k$.

The transmitting-end station 1 further includes the phase alignment unit 6 that is connected to the encoder 5 and which together performs a data generating function. The encoder 5 provides a signal of all n bits comprising the k data from the channels and the generated (n–k) error correction bits to the phase alignment unit 6. The phase alignment unit 6 compensates for a delay due to the error correction coding so as to phase all the n bits. The phase alignment unit 6 may be, for example, a delay circuit capable of aligning a delay time appropriately. The signals comprising the n bits in phase are then passed to the electrical-optical converter 7, which is also included in the transmitting-end station 1. The electrical-optical converter 7 converts the electrical signals of the n bit into optical signals having wavelengths $\lambda_1$ to $\lambda_n$, respectively.

The transmitting-end station 1 has the wavelength-multiplexing unit 8, which is provided by the optical signals from the electrical-optical converter 7, for wavelength-multiplexing the optical signals and delivering the multiplexed signals to the optical line 3.

The wavelength-multiplexing unit 8 may be constructed by a wavelength-combination unit for multiplexing the optical signals having the wavelengths $\lambda_1$ to $\lambda_n$ together. It should be noted that the error correction bits are transmitted with the wavelengths different from those of the signals corresponding to the data from the channels $CH_1$ to $CH_k$.

This leads to the fact that the transmission rate for the data coming from the channels $CH_1$ to $CH_k$ is not adversely affected by the addition of the error correction bits. It should be also noted that reserved bits within the SOH are not used to transmit the error correction bits so as to overcome the problem caused by the conventional error correction method. Therefore, according to the first embodiment of the present invention, it is advantageous that an error correcting coding scheme can be easily added to various existing WDM transmission systems.

The receiving-end station 2 comprises the wavelength-demultiplexing unit 11 for receiving the wavelength-multiplexed signals from the transmitting-end station 1 through the optical line 3 and separating the received wavelength-multiplexed signals into n optical signals having wavelengths $\lambda_1$ to $\mu_n$, respectively. The receiving-end station 2 further comprises the optical-electrical converter 12 being connected to the wavelength-demultiplexing unit 11 and for converting the n optical signals input from the wavelength-demultiplexing unit 11 to corresponding electrical signals. The receiving-end station 2 has the decoder 13, which is connected to the optical-electrical converter 11 and receives and decodes the electrical signals.

The electrical signals received by the decoder 13 are formed by k bits, each corresponding to one of the channels $CH_1$ to $CH_k$, and (n–k) error correction bits. Then the decoder 13 performs a data regenerating function, which includes error correction decoding by means of the k bits representing the data from the channels $CH_1$ to $CH_k$ and the (n–k) error correction bits and sends the decoded signals to the SOH termination unit 14, which is also included in the receiving-end station 2. The SOH termination unit 14 terminates the SOHs and delivers the signals with the SOHs to a succeeding device (not shown in FIG. 2) as data representing the data coming from the channels $OH_1$ to $CH_k$.

In this embodiment, the transmission data on the channels $CH_1$ to $CH_k$ may be formed in accordance with various transmission schemes such as a frame transmission scheme or an ATM (Asynchronous Transfer Mode) cell scheme. Since the phase alignment unit 6 is provided in the transmitting-end station 1, it is sufficient that the SOH inserting unit 4 adds the SOH to each of the data corresponding to the channels $CH_1$ to $CH_k$.

Figure 3:
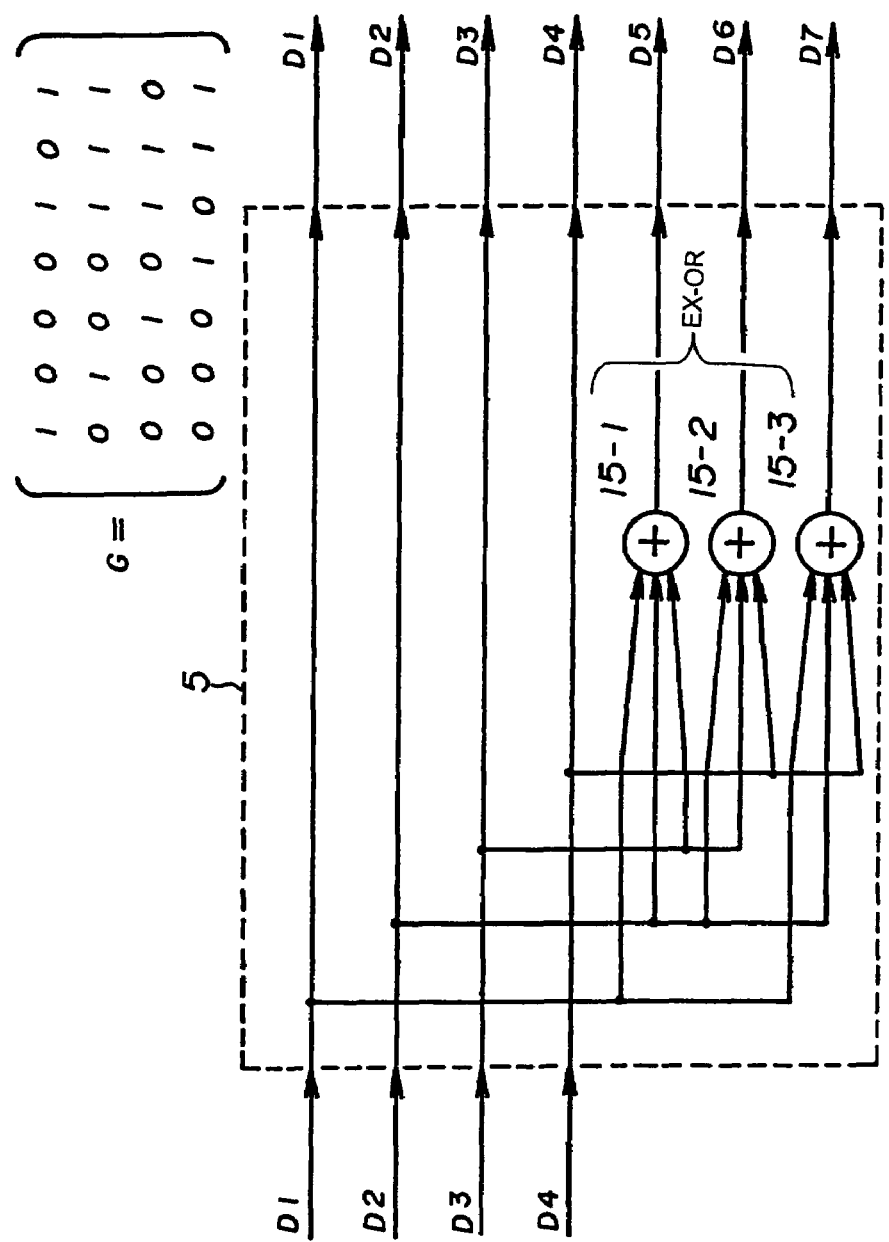
FIG. 3 is a diagram for explaining an encoder according to the first embodiment of the present invention.

FIG. 3 is a schematic diagram of an encoder for (n, k) Hamming coding according to the first embodiment of the present invention. Since Hamming coding is a well-known coding scheme, for a detail explanation thereof, it is recommended that a general textbook concerning "communications" should be referred to. Briefly speaking, for any positive integer m, there is a Hamming code with parameters $k=2^m-m-1$ and $n=2^m-1$. For example, we consider a k=4, n=7 Hamming code. This means that the number of the channels is k=4 and the number of the error correction bits is (n–k)=3. The encoder, illustrated in FIG. 3, performs (7, 4) Hamming coding. The encoder includes exclusive-OR logic circuits 15-1, 15-2 and 15-3. The data corresponding to the channels $CH_1$ to $CH_4$ are denoted as D1 to D4, respectively, and the error correction bits generated by the encoder are denoted as D5 to D7, as shown in FIG. 3. Thus, the encoder generates three error correction bits D5 to D7 for the four data D1 to D4. In this case, a generator matrix G for this coding scheme is represented as:

$$G = \begin{pmatrix} 1 & 0 & 0 & 0 & 1 & 0 & 1 \\ 0 & 1 & 0 & 0 & 1 & 1 & 1 \\ 0 & 0 & 1 & 0 & 1 & 1 & 0 \\ 0 & 0 & 0 & 1 & 0 & 1 & 1 \end{pmatrix}$$

Then this coding scheme can perform one bit error correction with a minimum intersymbol distance of 3.

Figure 4:
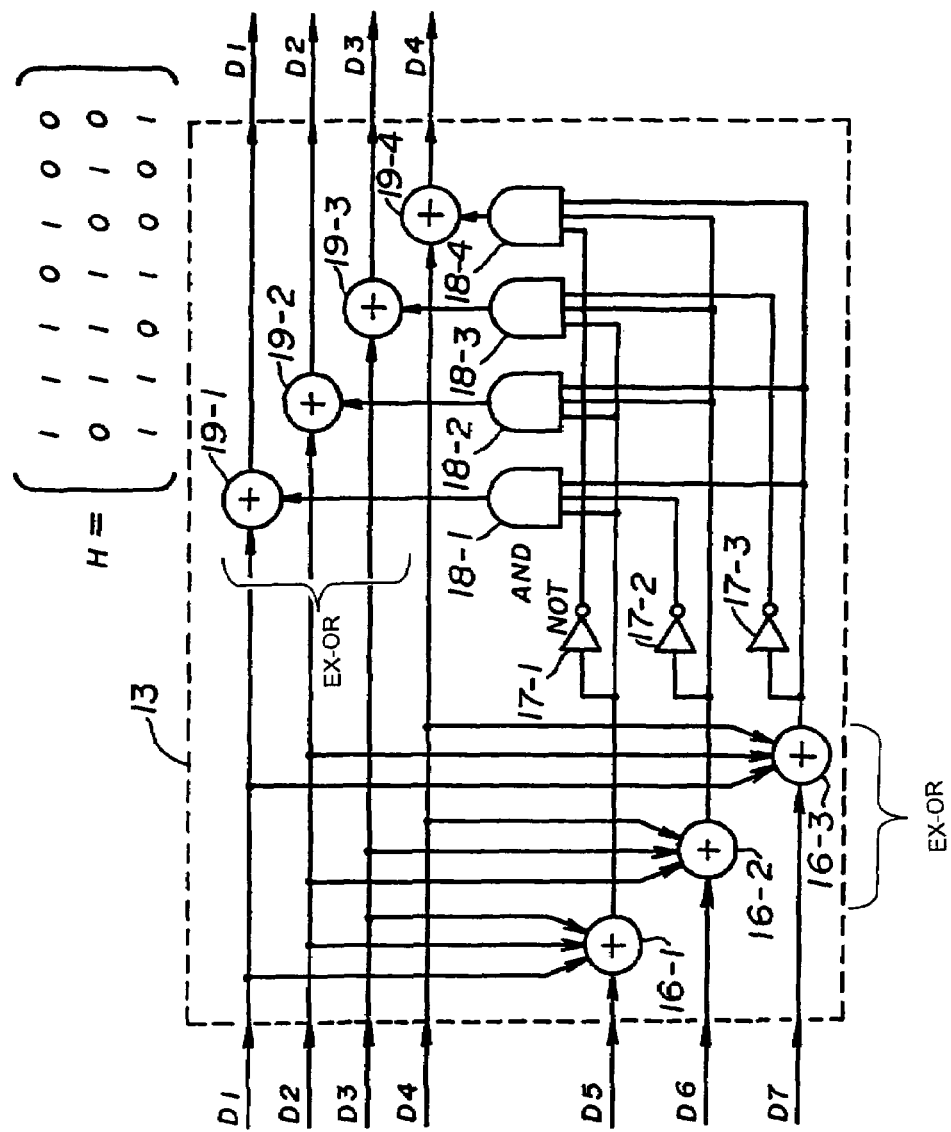
FIG. 4 is a diagram for explaining a decoder according to the first embodiment of the present invention.

FIG. 4 is a schematic diagram of a decoder according to the first embodiment of the present invention. The decoder is constructed to be a (7, 4) Hamming code decoder such that its decoding scheme is adapted to the encoder shown in FIG. 3. The decoder includes exclusive-OR logic circuits 16-1, 16-2 and 16-3, inverters 17-1, 17-2 and 17-3, and AND logic circuits 18-1, 18-2, 18-3 and 18-4. In this case, a check matrix for the decoder is represented as:

$$H = \begin{pmatrix} 1 & 1 & 1 & 0 & 1 & 0 & 0 \\ 0 & 1 & 1 & 1 & 0 & 1 & 0 \\ 1 & 1 & 0 & 1 & 0 & 0 & 1 \end{pmatrix}$$

Referring again to FIG. 3, an operation of the encoder 5 of the transmitting-end station 1 is explained. It is assumed that all the data D1 to D4 have value "1". After the (7, 4) Hamming coding, since the exclusive-OR circuits 15-1, 15-2 and 15-3 have the same behavior as that of a modulo-2 adder, the error correction bits D5 to D7 become "1" at the same timing. Thus, the data D1 to D7 output by the encoder 5 are represented as "1111111."

With reference to FIG. 4, the decoder 13 of the receiving-end station 2 is operable to make output signals from the exclusive-OR circuits 16-1, 16-2 and 16-3 to have a value of "0" in response to the received signals D1 to D7 representative of "1111111." In this case, the AND circuits 18-1 to 18-4 are operable to produce an output signal having a value of "0", and the exclusive-OR circuits 19-1 to 19-4 are operable to allow the data D1 to D4, respectively, to pass through the corresponding exclusive-OR circuits. Therefore, the data D1 to D4 provided to the decoder 13 are directly output from the decoder 13 and include no errors.

Now, we consider that an error has occurred with one bit such that a true data D2="1" is replaced with an erroneous data D2="0" for the channel CH$_2$. In this case, each of the exclusive-OR circuits 16-1, 16-2 and 16-3 outputs a signal having a value of "1", and each of the AND circuits 18-1, 18-3 and 18-4 generates a signal having a value of "0." However, the AND circuit 18-2 will output a signal "1." Then, the exclusive-OR circuit 19-2 receives a value of "0" on a line D2 and a value of "1" from the AND circuit 18-2 and generate "1" as a result of an exclusive-OR operation between "0" and "1". Thus, the data on the line D2 is inverted in the decoder 13 and the erroneous data D2 can be corrected. Other data D1, D3 and D4 having the true value and input to the decoder 13 are directly output from the decoder 13.

Figure 5:
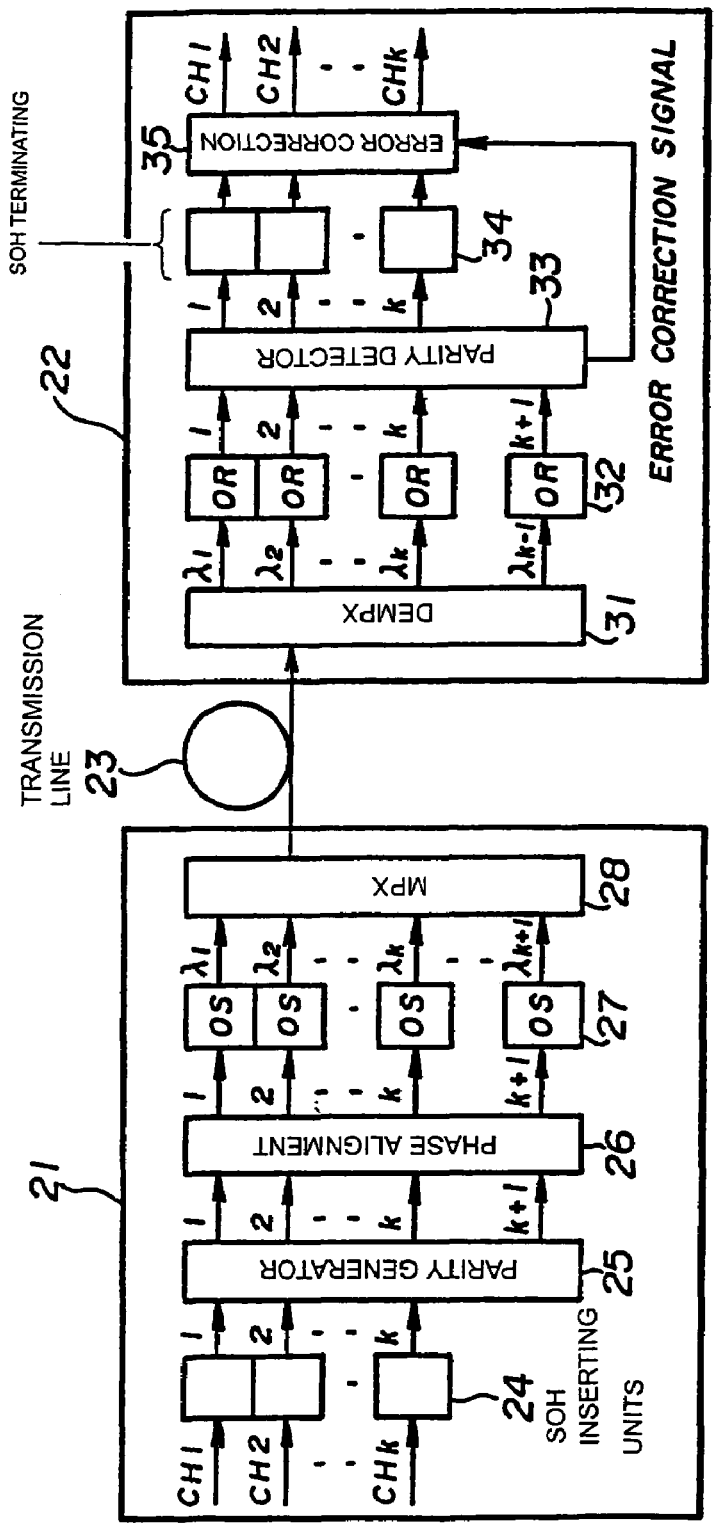
FIG. 5 is a schematic diagram of a second embodiment of an optical transmission system according to the present invention.

A second embodiment of an optical transmission system according to the present invention is shown in FIG. 5. As shown in FIG. 5, the optical transmission system comprises a transmitting-end station 21, a receiving-end station 22, an optical transmission line connecting the transmitting-end station 21 and the receiving-end station 22. The transmitting-end station 21 includes an SOH inserting unit 24, a parity generator 25, a phase alignment unit 26, an electrical-optical converter (OS) 27 and a wavelength-multiplexing unit 28. The receiving-end station 22 includes a wavelength-demultiplexing unit 31, an optical-electrical converter (OR) 32, a parity detector 33, an SOH terminating unit 34 and an error correction unit. In FIG. 5, the encoding unit and its function, as in FIG. 2, are incorporated in the parity generator 25 and the decodinci unit and its function, as in FIG. 2, are incorporated in the parity detector 33.

At the transmitting-end station 24, the SOH inserting unit 24 adds an individual SOH (Section Over Head) to each transmission data coming from k channels CH$_1$ to CH$_k$ and supplies the k transmission data with the individual SOH to the parity generator 25. The parity generator 25 calculates a parity bit for the supplied k transmission data and outputs the calculated parity bit together with the k transmission data, and thus, passing (k+1) data to the phase alignment unit 26. The phase alignment unit 26 compensates for a delay caused by the parity generator 25 and sends resulting in-phase (k+1) data to the electrical-optical converter 27. The electrical-optical converter 27 converts the in-phase (k+1) data to (k+1) optical signals having different wavelengths $\lambda_1$ to $\lambda_{k+1}$ and passes the optical signals to the wavelength-multiplexing unit 28. The wavelength-multiplexing unit 28 multiplexes the (k+1) optical signals and sends the multiplexed signals to the optical transmission line 23. In this case, the parity bit calculated for the k transmission data on the channels CH$_1$ to CH$_k$ corresponds to the vertical parity.

At the receiving-end station 22, the wavelength-demultiplexing unit 31 receives the wavelength-multiplexed signals through the optical transmission line 23 and separates them into the optical signals having the different wavelengths $\lambda_1$ to $\lambda_{k+1}$. The optical signals corresponding to the wavelengths $\lambda_1$ to $\lambda_{k+1}$ are passed to the optical-electrical converter 32 and then converted to (k+1) electrical signals in the optical-electrical converter 32. Then, the (k+1) electrical signals are transferred from the optical-electrical converter 32 to the parity detector 33.

The parity detector 33 performs not only one parity check on the data conveyed on the channels CH$_1$ to CH$_k$ by detecting the parity bit added to the transmission data at the parity generator 25, but also the other parity check on a frame corresponding to the channels CH$_1$ to CH$_k$ by detecting error monitoring bytes B1 and B2 within the SOH. As a result of the parity checks, the parity detector 33 determines an error position signal identifying a position of an erroneous bit and sends the error position signal to the error correction unit 35.

The SOH terminating unit 34 terminates the SOHs of the k data conveyed on the k channels CH$_1$ to CH$_k$ and sends the k transmission data to the error correction unit 35. Then the error correction unit 35 performs the error correction on the transmission data and delivers the error corrected transmission data to a further device (not shown in FIG. 5).

Figure 6:
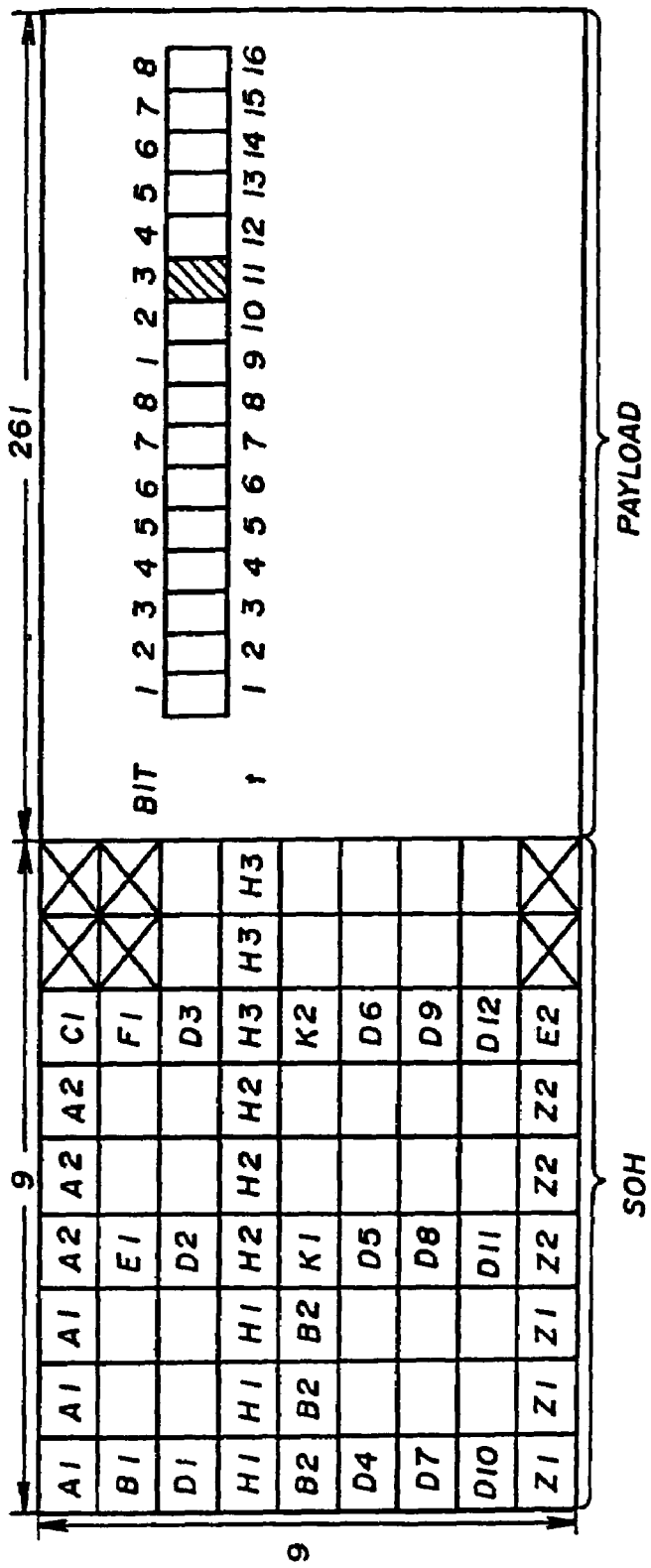
FIG. 6 is a diagram for explaining a configuration of an STM-1 frame.

FIG. 6 is a diagram for explaining a configuration of an STM-1 (Synchronous Transfer Module Level One) frame. This STM-1 frame is used for the SDH and its bit rate is 155.52 Mbps. The STM-1 signals are formed by multiplexing three STM-0 signals having the bit rate of 51.84 Mbps. For example, STM-4 signals formed by multiplexing the four STM-1 signals have a bit rate of 622.08 Mbps. The SOH within the STM-1 signal is represented as a 9 row by 9 column structure as depicted in FIG. 6, and a payload is represented as a 9 row by 261 column structure.

The SOH contains frame synchronous bytes A1 and A2, a STM identifier byte C1, a monitoring byte B1, also called BIP-8 (Bit Interleaved Parity 8), an orderwire byte E1 for voice communications, a user byte F1 for specifying a failure, data link bytes D1, D2 and D3 for DCC (Data Communication Channel), an AU pointer bytes H1, H2 and H3, a monitoring byte B2, also called a BIP-Nx24 (Bit Interleaved Parity Nx24) byte, control bytes K1 and K2 for APS (Automatic Protection Switch), data link bytes D4 to D12 for data communication channels, reserved bytes Z1 and Z2, and an orderwire byte E2 for voice communications. Blank bytes and bytes marked with X are reserved or undefined bytes.

The error monitoring byte B1 for a current frame is derived from the previous frame by calculating parity bits for each bit position over the entire bytes. The parity detector 33 in the receiving-end station 22, as shown in FIG. 5, can perform parity check for each bit position by calculating the parity bits for every bit position over the entire bytes in the current frame and referring to the B1 byte of the SOH in the next frame.

The error monitoring byte B2 represents a bit interleaved parity-Nx24, where N is a level number for the STM-N. The byte B2 is derived from the previous frame by grouping BIP-Nx24s from the previous frame into a block and calculating parity bits for each bit position over the entire bytes in the block. Assuming N is equal to 1, as shown in FIG. 6, the parity bits for the 24 bits are calculated and added to the frame in accordance with a bit order, and thus resulting in 3 bytes as the parity bits. Any suitable bit generation and addition schemes, as well as correspondingly suitable bit detection schemes can be applied to the scheme for generating, adding and detecting the error monitoring bits B1 and B2.

The parity detector 33 in the receiving-end station 22 is operable to perform parity check on each bit position within the received frame by means of either or both of the error monitoring bits B1 and B2. In other words, the parity detector 33 can perform horizontal parity check. At the same time, the parity detector 33 performs another parity check, i.e. vertical parity check, by means of the (k+1) data comprising the k data corresponding to the channels $CH_1$ to $CH_k$ followed by the parity bits.

As the parity detector 33 detects a vertical parity error in the current frames, it is appreciated that some of the currently received frames corresponding to the channels $CH_1$ to $CH_k$ contain one bit error. The parity detector 33 also detects a horizontal parity error in order to identify the channel and the bit position where the parity error occurs. Thus, the parity detector 33 can determine the position of the error bit on the basis of the channel and the bit position of the parity error.

The position of the error bit is determined as follows. For example, a bit sequence comprising bits 1 to 8 contained in the payload, as depicted in FIG. 6, appears repeatedly at times t1, t2, t3 and so on. Then, one parity check using the error monitoring bit B1 is performed so as to detect the parity error at a position of the bit 3 in the bit sequence and the other parity check is also performed using the bit (k+1) representing the parity bit following the transmission data applied to the parity detector 33 at the time t11 in order to detect the parity error. As a result of the parity checks, it is determined that a transmission error has occurred at a bit position, as illustrated as a shaded box in FIG. 6. Subsequently, a signal representing the bit error occurring position is sent to the error correction unit 35 for correcting the bit with a transmission error. And thus, the error bit can be corrected. As described above, the bit error occurring position can be determined by a combination of the vertical parity check and the horizontal parity check, the erroneous bit can be easily corrected by holding the k data conveyed on the k channels $CH_1$ to $CH_k$ until the bit error occurring position is detected in the SOH terminating unit 34 or the error correction unit 35.

In the above-mentioned first embodiment of the present invention, when the (7, 4) Hamming coding is employed, redundant bits comprising three bits have to be added to the transmission data by performing the error correction coding. On the contrary, in the second embodiment of the present invention, as shown in FIG. 4, it is sufficient that only a single additional bit is added, as a parity bit, to the transmission data. This means that a combination of the parity generator 25 and the parity detector 33, as shown in FIG. 4, may be much simply constructed than that of the error correction encoder 5 and the error correction decoder 13, as shown in FIG. 2. Thus, a high quality transmission can be achieved by the optical transmission system according to the second embodiment of the present invention without making structures of the transmitting-end station 21 and the receiving-end station 22. Advantageously, according to the second embodiment of the present invention, data rates for primary data on the channels $CH_1$ to $CH_k$ are not adversely affected by the parity bit. This is because the parity bit is transmitted over the optical transmission line 23 after being converted to a wavelength other than those of the primary data.

Furthermore, in one variation of the second embodiment of the present invention, a further parity check can be implemented in addition to the parity check using the monitoring bits B1 and B2. In this case, at the transmitting-end, one frame is divided into a plurality of blocks, a parity bit is calculated for each block, and the calculated parity bits are transmitted in reserved bits within the SOH. Then, at the receiving-end, the parity bits corresponding to the blocks are received, and the further parity check is performed based on the received parity bits for the blocks. In other words, a small number of parity bits, this number being equal to a number of the blocks, are added to the SOH at the reserved bits thereof, so that the number of the bits capable of being corrected can be increased.

Figure 7:
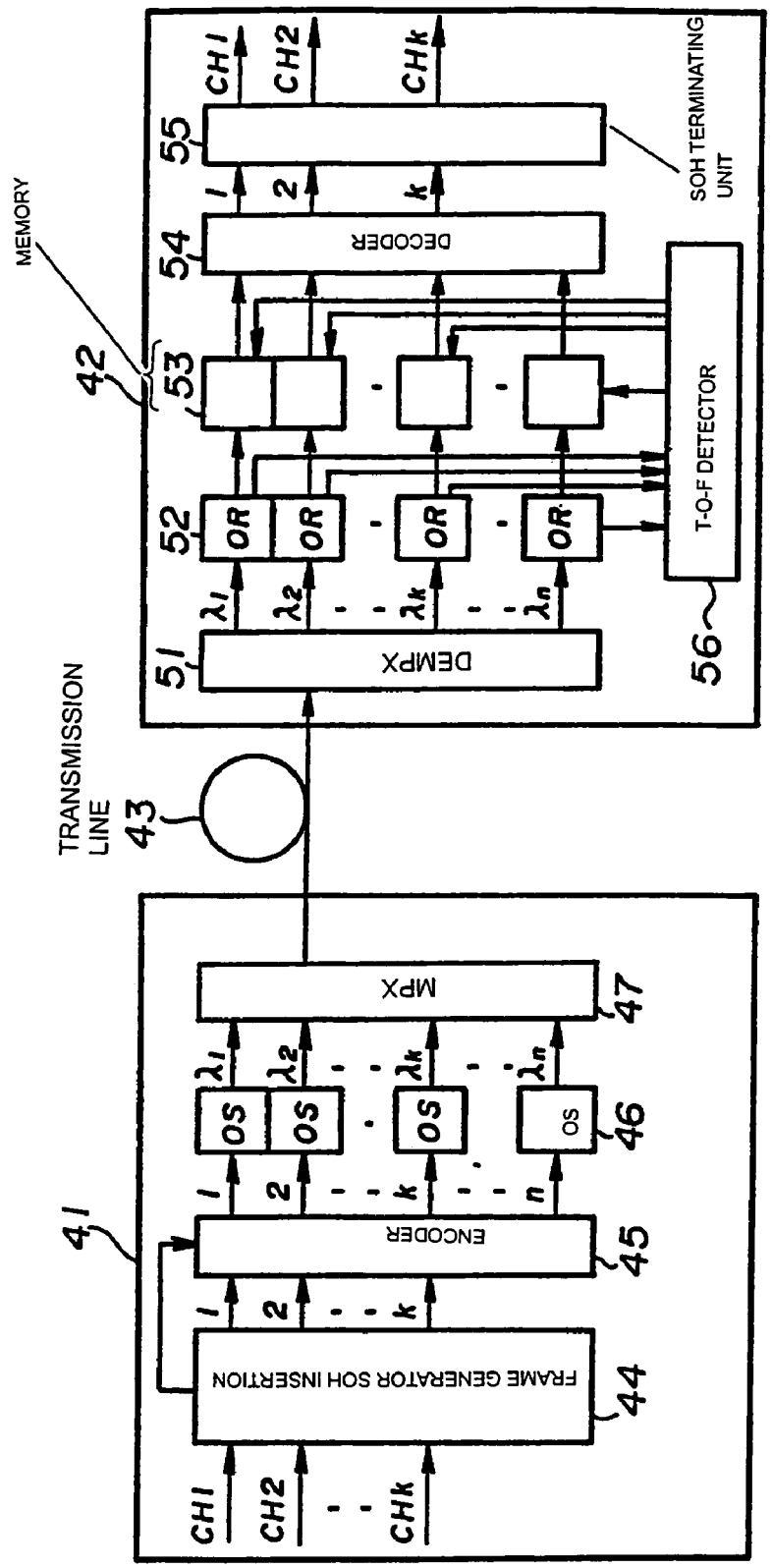
FIG. 7 is a schematic diagram of an optical transmission system according to a third embodiment of the present invention.

FIG. 7 is a schematic diagram of an optical transmission system according to a third embodiment of the present invention. The optical transmission system comprises a transmitting-end station 41, a receiving-end station 42 and an optical transmission line 43 for connecting the transmitting-end station 41 and the receiving-end station 42.

The transmitting-end station 41 includes a frame generating and SOH inserting unit 44, an encoder 45, an electrical-optical converter (OS) 46 and a wavelength-multiplexing unit 47. The receiving-end station 42 includes a wavelength-demultiplexing unit 51, an optical-electrical converter (OR) 52, a memory unit 53, a decoder 54, an SOH terminating unit 55 and a top-of-frame ("TOF") detector 56.

At the transmitting-end station 41, the frame generating and SOH inserting unit 44 generates a frame for each of channels $CH_1$ to $CH_k$, such that tops from every frames are synchronous with others, inserts a frame number for each of the channels $CH_1$ to $CH_k$ into a reserved byte within an SOH, and sends the frames to the encoder 45. The encoder 45, for example, performing a (n, k) Hamming coding, may accomplish an error correction coding on every bits other than k frame synchronization bytes within the SOH over the frame and add the frame synchronization byte for a sequence of (n−k) error correction bits.

In other words, the frame generating and SOH inserting unit 44 adds the frame synchronization byte for the n channels and sends control information including the frame synchronization byte to the encoder 45. Then, the encoder 45 generates the (n−k) error correction bits for the k data on the k channels, respectively, without taking the frame synchronization bytes into account in response to the control information received from the unit 44 and adds the generated (n−k) error correction bits to the k data. Thus, the n data, n is calculated from an equation:

$$n=(n-k)+k$$

are generated by the encoder 45. This means that the encoder 45 generates k sequences of the transmission data for the k channels and (n−k) sequences of the error correction bits. The encoder 45 also adds the frame synchronization bit to the (n−k) sequences of the error correction bits. Therefore, all of the n sequences are individually added to by the frame synchronization byte.

The electrical-optical converter 46 converts the n sequences received from the encoder 45 into n optical signals having different wavelengths $\lambda_1$ to $\lambda_n$, and then sends the optical signals to the wavelength-multiplexing unit 47. The wavelength-multiplexing unit 47 multiplexes the n optical signals and sends the multiplexed signals to the receiving-end station 42 over the optical transmission line 43.

At the receiving-end station 42, the wavelength-demultiplexing unit 51 receives the multiplexed signals through the optical transmission line 43, and then separates the multiplexed optical signals into optical signals having the different wavelengths $\lambda_1$ to $\lambda_n$. The separated optical signals are applied to the optical-electrical converter 52, where the separated optical signals are converted to electrical signals. The optical-electrical converter 52 stores the electrical signals to the memory unit 53 and supplies the electrical signals to the top-of-frame detector 56. Then, the top-of-frame detector 56 determines a top of every frame of the n sequences by detecting each frame synchronization byte for the n sequences. Then the top-of-frame detector 56 reads the n sequences from the memory unit 53 by controlling a read-out timing so as to align the top of the frame for each of the n sequences with the others, and sends the read out n sequences to the decoder 54.

However, in a long distance transmission environment, even if the wavelength-multiplexed signals are sent from the transmitting-end station 41 via the optical transmission line 43, the optical signals having the different wavelengths may be usually received by the receiving-end station 42 at different timings. This is because the fiber may have different transmission rates for the n sequences having the different wavelengths. According to the third embodiment of the present invention, advantageously, this problem is overcome by controlling the read out timing for the n sequences stored in the memory unit 53 in order to allow the top of each of the n sequences to be synchronous with the others, and thus keeping the n sequences in phase. It is noted that the memory unit 53 may be formed by an FIFO buffer suitable for controlling the read out timing.

The decoder 54 is designed so as to be reversibly operable with the encoder 45 such that the decoder 54 performs an error correction decoding which is adapted to the error correction coding implemented by the encoder 45. The decoder 54 can correct erroneous data present at the channels $CH_1$ to $CH_k$ and send the error corrected k data to the SOH terminating unit 55. The SOH terminating unit 55 terminates the SOHs of the k data and sends the k data to a further processing stage.

In the third embodiment of the present invention, the frame generating and SOH inserting unit 44 in the transmitting-end station 41 is followed by the encoder 45. Alternatively, the frame generating and SOH inserting unit 44 may be divided into a frame generating unit and an SOH inserting unit such that the frame generating unit is followed by the encoder 45 which is followed by the SOH inserting unit. In this case, at the receiving-end station 42, the top-of-frame detector can detect the tops of the frames and keep the tops of the frames in phase, and then, the decoder 54 can perform the error correction decoding.

As earlier described, the optical transmission line 43 has different transmission rates of the optical signals depending on the wavelengths of the optical signal. For example, in a high speed, long distance transmission with 100 Gbps, the phases of the optical signals that are demultiplexed by the wavelength-demultiplexing unit 51 may deviate from the others. In order to avoid this deviation of the phases, it is ensured that the encoder 54 can perform the error correction decoding on the high speed transmission data by aligning the frames in phase. In this case, the in-phase frames can be achieved from the memory unit 53 by detecting the tops of the frames on the basis of frame synchronization bytes added to the frames in order to keep the frames in phase at the transmitting-end station 41.

Figure 8:
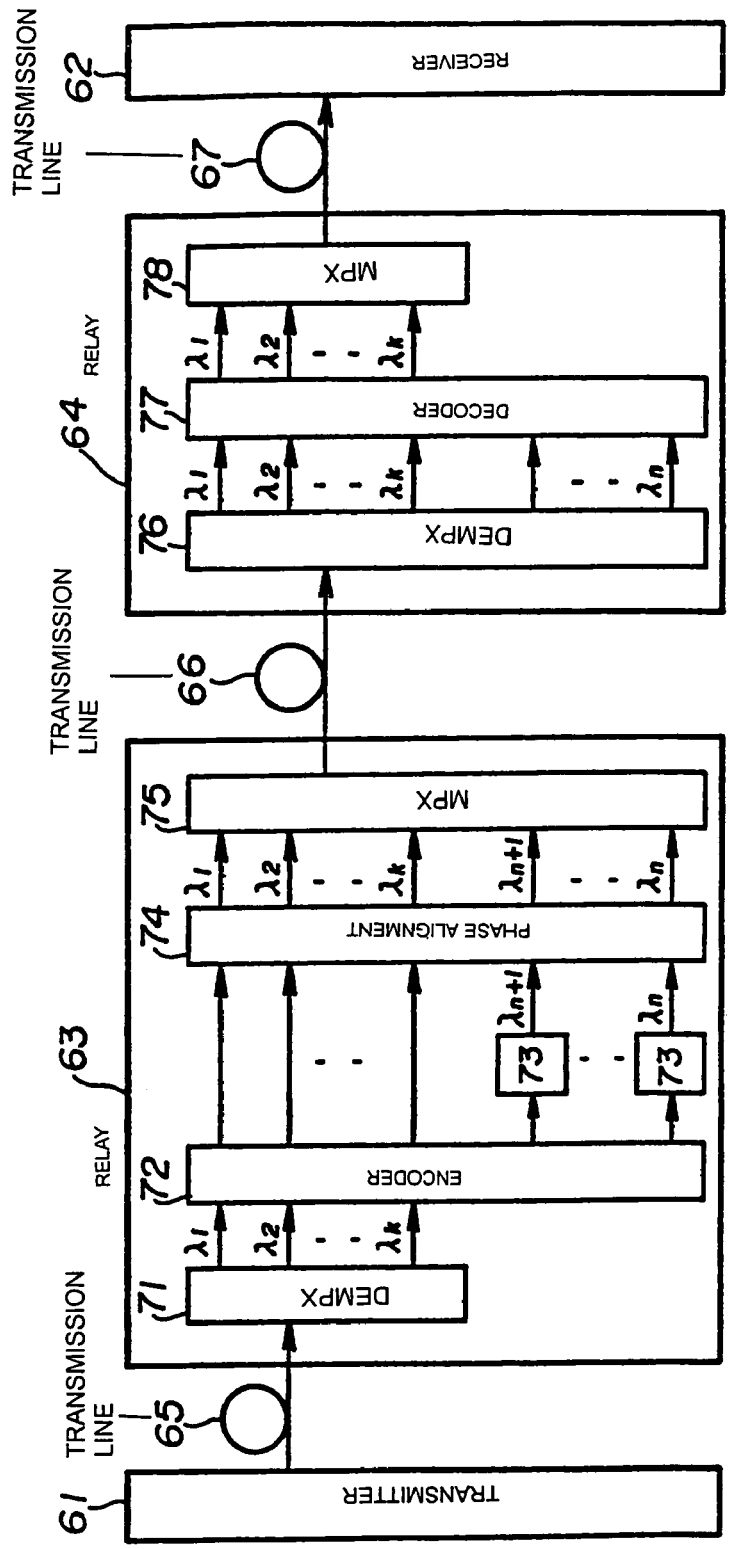
FIG. 8 is a schematic diagram of an optical transmission system according to a fourth embodiment of the present invention.

FIG. 8 is a schematic diagram of an optical transmission system according to a fourth embodiment of the present invention. The optical transmission system comprises a transmitting-end station 61 and a receiving-end station 62 and is provided with optical relay transmission devices 63 and 64 arranged between the transmitting-end station 61 and the receiving-end station 62. The optical transmission system further includes a first optical transmission line 65 for connecting the transmitting-end station 61 and the optical relay transmission device 63, a second optical transmission line 66 for connecting the optical relay transmission device 63 and the optical relay transmission device 66, and a third optical transmission line 67 for connecting the optical relay transmission device 64 and the receiving-end station 62. In the optical transmission system, a high quality transmission of wavelength-multiplexed signals can be achieved between the optical relay transmission devices 63 and 64 via the second optical transmission line 66. As shown in FIG. 8, the optical relay transmission device 63 includes a wavelength-demultiplexing unit 71, an encoder 72, a wavelength converter 73, a phase alignment unit 74 and a wavelength-multiplexing unit 75. The optical relay transmission device 64 includes a wavelength-demultiplexing unit 76, a decoder 77 and a wavelength-multiplexing unit 78.

The optical relay transmission device 63 may, for example, be operable to perform an error correction coding and a wavelength multiplexing in order to function in the same manner as the transmitting-end station 1 shown in FIG. 2. The optical relay transmission device 64 may also be operable to perform a wavelength demultiplexing and an error correction decoding in order to function in the same manner as the receiving-end station 2 in FIG. 2.

The wavelength-demultiplexing unit 71 separates the received signals into k optical signals having wavelengths $\lambda_1$ to $\lambda_k$ and supplies the k optical signals to the encoder 72 for performing the error correction coding.

The encoder 72 may be formed by an optical logic circuit and perform the error correction coding with respect to the optical signals without converting the optical signals to electrical signals. Assuming that a (n, k) Hamilton code is applied to the encoder 72, then the encoder 72 generates (n−k) error correction bits. The wavelength converter 73 converts the wavelengths for the (n−k) error correction bits generated and received from the encoder 72 to wavelengths $\lambda_{k+1}$ to $\lambda_n$ other than the wavelengths $\lambda_1$ to $\lambda_k$ of the k optical signals. Then, the phase alignment unit 74 receives the k optical signals having the wavelengths $\lambda_1$ to $\lambda_k$ and corresponding to the channels $CH_1$ to $CH_k$ from the encoder 72 and (n−k) error correction bits having the wavelengths $\lambda_{k+1}$ to $\lambda_n$. Thus, the phase alignment unit 74 receives n optical signals in total.

The phase alignment unit 74 may be also formed by an optical logic circuit. The phase alignment unit 74 compensates for a delay due to a processing of the encoder 72, matches the phase of each of the n optical signals with the others, and sends the n optical signals in phase to the wavelength-multiplexing unit 75. The wavelength-multiplexing unit 75 multiplexes the n optical signals and delivers the multiplexed optical signals to the optical transmission line 66.

Alternatively, the optical relay transmission device 63 may be arranged so as to convert the k optical signals separated by the wavelength-demultiplexing unit 71 to electrical signals. In this case, the optical relay transmission device 63 performs an error correction coding in the same manner as described in the first embodiment, as shown in FIG. 2, and converts the k coded electrical signals along the (n−k) generated error correction bits to n optical signals by an electrical-optical converter. In this configuration, the wavelength converter 73 can be dispensed with and the electrical-optical converter are provided at a succeeding stage to the phase alignment unit 74, such that the n electrical signals are converted to the n optical signals having the wavelengths $\lambda_1$ to $\lambda_n$ and supplies the n optical signals to the wavelength-multiplexing unit 75.

The decoder 77 in the optical relay transmission device 64 may be formed by an optical logic circuit. In this case, the n optical signals, having the wavelengths $\lambda_1$ to $\lambda_n$, separated by the wavelength-demultiplexing unit 76 are directly applied to the decoder 77, where the error correction decoding is performed on the n optical signals. Then, the k decoded optical signals having the wavelengths $\lambda_1$ to $\lambda_k$ are provided to the wavelength-multiplexing unit 78 for multiplexing the k optical signals so as to be delivered to the receiving-end station 62 via the optical transmission line 67. As a result, the optical signals input to the optical relay transmission device 64 can be processed in the optical relay transmission device 64 and then be delivered to the optical transmission line 67 without being converted to the electrical signals. Alternatively, the optical relay transmission device 64 may be provided with an optical fiber amplifier following the wavelength-multiplexing unit 78 for intermediately amplifying the multiplexed signals.

Alternatively, the optical relay transmission device 64 may be arranged so as to convert the n optical signals separated by the wavelength-demultiplexing unit 76 to n electrical signals. In this case, the optical relay transmission device 64 performs an error correction decoding in the same manner as described in the first embodiment and shown in FIG. 2, and converts the k decoded electrical signals to n optical signals corresponding to the k wavelengths for the k channels, respectively, by an electrical-optical converter. Then, the k decoded optical signals having the wavelengths $\lambda_1$ to $\lambda_k$ can be provided to the wavelength-multiplexing unit 78 for multiplexing the k optical signals so as to be delivered to the receiving-end station 62 via the optical transmission line 67.

It can be easily appreciated that the transmission implemented between the optical relay transmission device 63 and the optical relay transmission device 64 can be applied to the transmission between the transmitting-end station 61 and the optical relay transmission device 63 or the optical relay transmission device 64 and the receiving-end station 62. This means that the transmission is implemented using wavelength-multiplexed optical signals with error correction bits which are generated at the transmitting-end station 61 or the optical relay transmission device 64, respectively. In this case, the optical relay transmission device 63 should be modified to include a decoder and the optical relay transmission device 64 should be modified to include an encoder. The optical relay transmission devices 63 and 64 are operable so as to receive the multiplexed optical signals, perform the error correction decoding on the received multiplexed optical signals, determine whether the error has been detected or not. If the error has been detected, the optical relay transmission devices 63 and 64 perform the error correction coding in order to allow the error to be corrected and multiplex the error corrected optical signals. Otherwise, the optical relay transmission devices 63 and 64 directly pass the received multiplexed optical signals to the following optical line.

Figure 9:
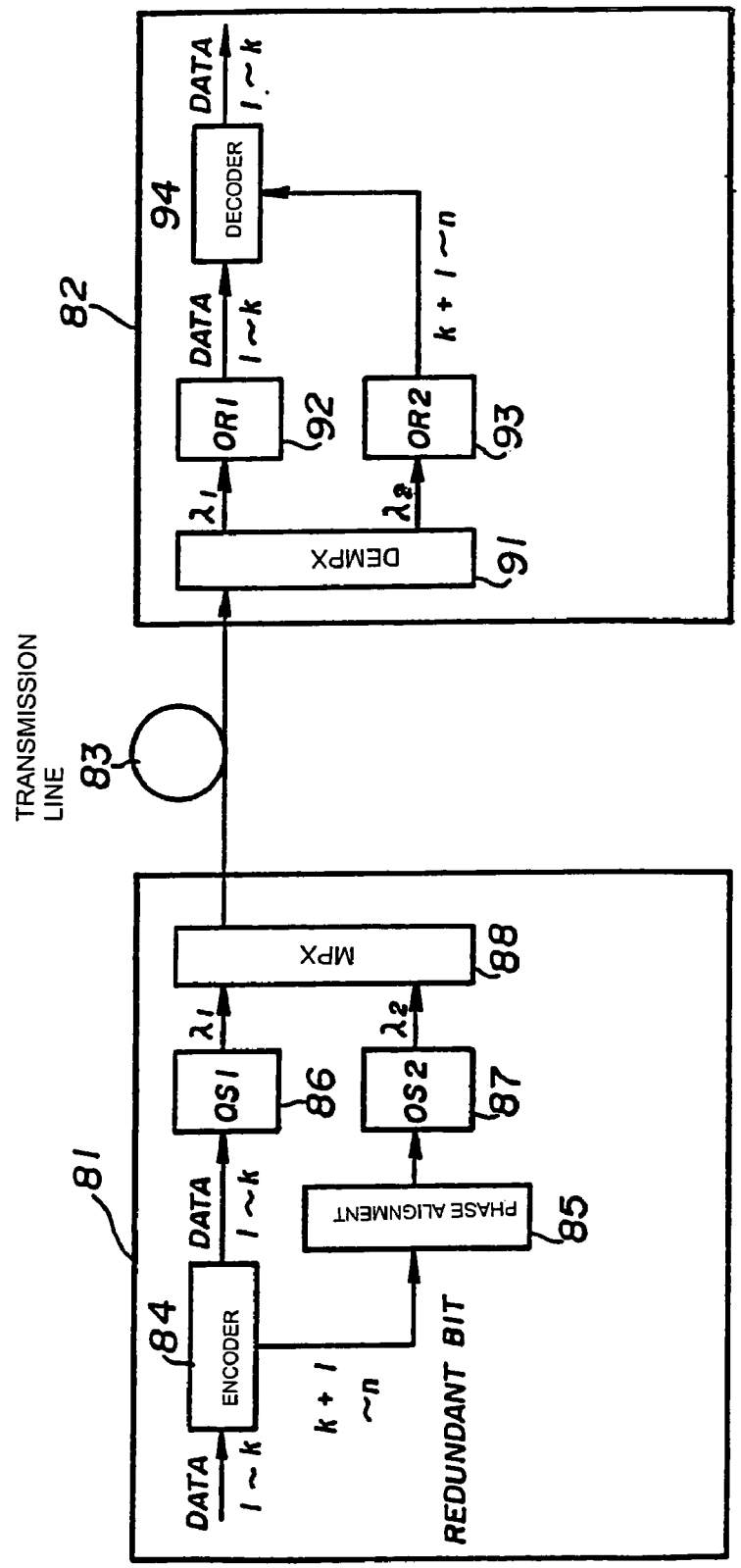
FIG. 9 is a schematic diagram of an optical transmission system according to a fifth embodiment of the present invention.

FIG. 9 is a schematic diagram of an optical transmission system according to a fifth embodiment of the present invention. The optical transmission system implements a TDM (Time Division Multiplex) transmission. The optical transmission system comprises a transmitting-end station 81, a receiving-end station 82 and an optical transmission line for connecting the transmitting-end station 81 and the receiving-end station 82, as shown in FIG. 9.

The transmitting-end station 81 includes an encoder 84, a phase alignment unit 85, electrical-optical converters (OS1, OS2) 86 and 87, and a wavelength-multiplexing unit 88. The receiving-end station 82 includes a wavelength-demultiplexing unit 91, optical-electrical converters (OR1, 0R2) 92 and 93, and a decoder 94.

We consider that a number of bits assigned to a time slot used for TDM equals to k. In this case, the encoder 84 implements a (n, k) Hamming coding and generates (n−k) error correction bits. It is noted that the time slot or a frame is a non-limiting example of the data to be error correction coded. For example, the error correction coding may be applied to a series of data by dividing the series of the data into any blocks containing k bits and performing the (n, k) Hamming coding.

The phase alignment unit 85 is operable so as to match a top of the (n−k) error correction bits with the top of k bits representing primary signals. To do this, the phase alignment unit 85 aligns the phases of the (n−k) error bits. The primary signals having the k bits are converted to an optical signal having a wavelength $\lambda_1$ by the electrical-optical converter 86 and the phase aligned (n−k) error bits are converted to an optical signal with a wavelength $\lambda_2$ by the electrical-optical converter 87. Then the wavelength-multiplexing unit 88 multiplexes the optical signal with the wavelength $\lambda_1$ and another optical signal with wavelength $\lambda_2$ and delivers the multiplexed signals to the receiving-end station 82 via the optical transmission line 83. Thus, the (n−k) redundant bits representing the error correction bits can be transferred without affecting a transmission rate for the k bits representing the primary signal.

Assuming that the encoder 84 performs the (7, 4) Hamming coding, as shown in FIG. 3, a series of four bits, D1 to D4, are input to a shift register. When the four bits D1 to D4 are stored in the shift register at the same time, redundant three bits D5 to D7 are concurrently calculated by means of a parallel output comprising the four bits D1 to D4. Then the four bits D1 to D4 are applied to the electrical-optical converter 86 in series and the redundant three bits D5 to D7 are applied to the electrical-optical converter 87 in series. Alternatively, the phase alignment unit 85 may be dispensed with by appropriately controlling a timing for outputting the four serial bits D1 to D4 and the redundant three serial bits D5 to D7.

Though the phase alignment unit 85, as shown in FIG. 9, is provided between the encoder 84 and the electrical-optical converter 87, the phase alignment unit 85 may be provided between the encoder 84 and the electrical-optical converter 86 such that a difference between processing times required for the primary signal having the k bits and the (n–k) redundant bits. Typically, the above-mentioned numeric numbers k and n are selected such that the relation between k and (n–k) is written as:

$$k > (n-k).$$

Preferably, in order to facilitate a frequency division of clock signals, these two numerical numbers are selected such that k equals to a multiple of (n–k).

At the receiving-end station 82, the wavelength-demultiplexing unit 91 separates the multiplexed optical signals into optical signals having wavelengths $\lambda_1$ and $\lambda_2$ and passes the separated two optical signals to the optical-electrical converters 92 and 93, where the optical signals are converted to k-bits and (n–k)-bits electrical signals. The decoder 94 receives the k bits representing the primary signal from the optical-electrical converter 92 as well as the (n–k) bits representing the redundant bits, and performs an error correction decoding. Therefore, this optical transmission system can automatically correct error bits due to transmission errors. Assuming that this decoder 94 employs the (7, 4) Hamming code, a decoding scheme, as shown in FIG. 4, can be applied to the decoder 94. This means that the decoder 94 receives in parallel the data D1 to D7 that are serially input to the receiving-end station 82, correct any errors included the data D1 to D4, convert the error corrected data D1 to D4 into a parallel format, and outputs the data D1 to D4 in parallel.

It should be noted that, according to the fifth embodiment of the present invention, a transmission rate for the primary signal could be maintained at the transmission rate achieved when no error correction bits are added. Therefore, advantageously, the existing optical transmission system can be improved with respect to a transmission quality by providing the encoder 84 and the wavelength-multiplexing unit 88 at the transmitting-end station as well as the wavelength-demultiplexing unit 91 and the decoder 94 for error correction decoding at the receiving-end station. Furthermore, the primary signal may not be limited to TDM signals, but may be extended to, for example, STM-N signals for one channel, as earlier described, by wavelength-multiplexing and transferring error correction bits with different wavelengths. Also, in this case, since the error correction bits do not occupy reserved bytes within an SOH, a high quality transmission can be achieved using this error correction-coding scheme.

Figure 10:
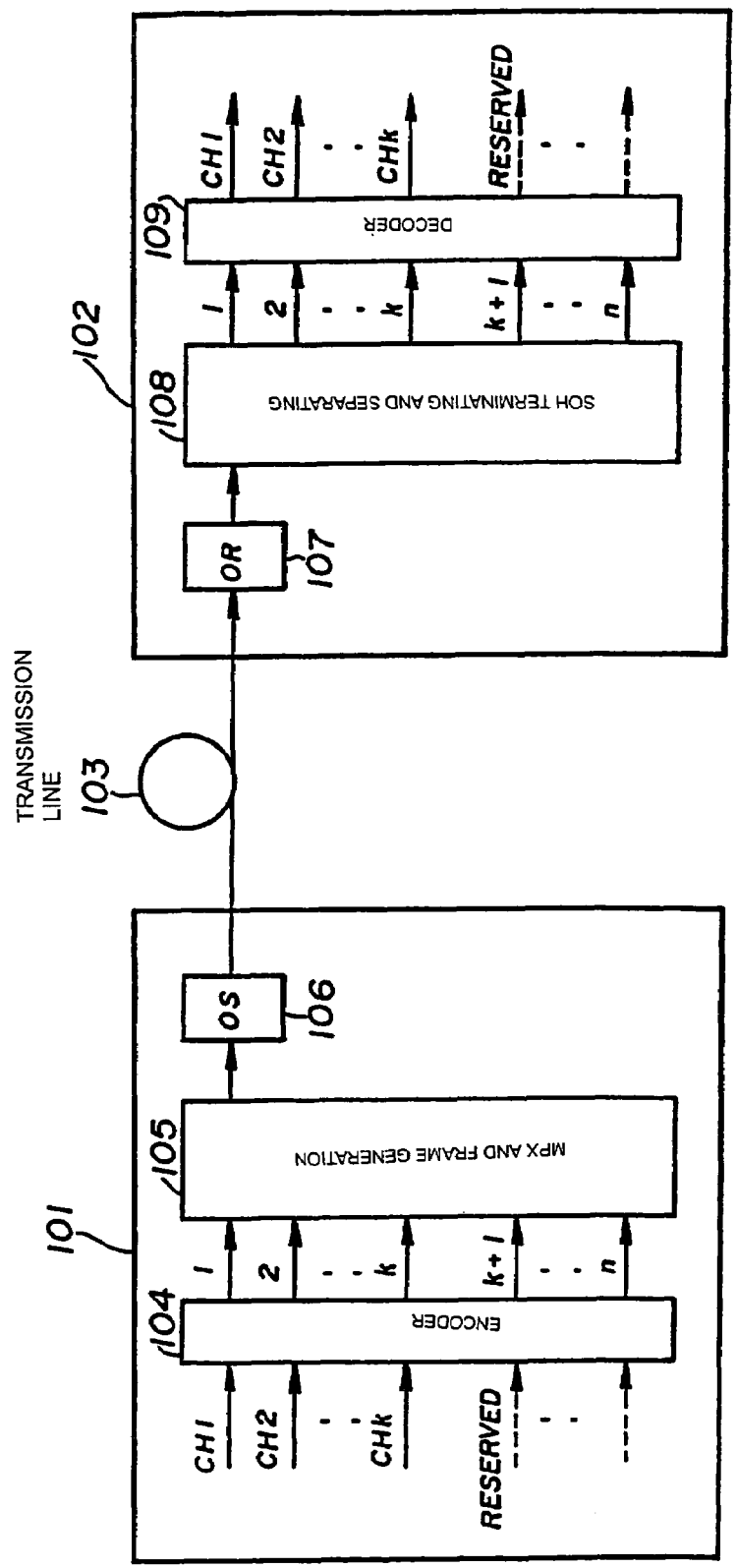
FIG. 10 is a schematic diagram of an optical transmission system according to a sixth embodiment of the present invention.

FIG. 10 is a schematic diagram of an optical transmission system according to a sixth embodiment of the present invention. The optical transmission system comprises a transmitting-end station 101, a receiving-end station 102 and an optical transmission line connecting the transmitting-end station 101 and the receiving-end station 102.

The transmitting-end station 101 includes an encoder 104, a multiplexing and frame generating unit 105 and an electrical-optical converter (OS) 106.

The receiving-end station 102 includes an optical-electrical converter (OR) 107, an SOH terminating and separating unit 108 and a decoder 109.

We consider that an n-multiplexing TDM transmission apparatus is operable so as to perform a time-division multiplexing with data for k channels $CH_1$ to $CH_k$. When the (n–k) channels $CH_{k+1}$ to $CH_n$ are reserved, the encoder 104 at the transmitting-end station 101 performs a coding such as a (n, k) Hamming coding so as to generate (n–k) error correction bits for the data conveyed on the k channels $CH_1$ to $CH_k$. Then, the multiplexing and frame generating unit 105 time-division multiplexes the complete data for the n channels while the multiplexing and frame generating unit 105 adds frame synchronization patterns to the multiplexed data in order to produce frames. The multiplexed data formed by the frames are transferred to the electrical-optical converter 106 where the multiplexed data with the frame synchronization patterns are converted to optical signals so as to be transmitted to the receiving-end station 102 through the optical transmission line 103.

At the receiving-end station 107, the optical-electrical converter 107 converts the received multiplexed optical signals to electrical signals and sends the electrical signals to the SOH terminating and separating unit 108. The SOH terminating and separating unit 108 detects the frame synchronization patterns, makes the frame to be synchronous with the others and separates the time-division multiplexed signals. The n separated signals corresponding to the n channels $CH_1$ to $CH_n$ are supplied to the decoder 109. The decoder 109 performs an error correction decoding based on the k bits representing the primary signal and the (n–k) bits representing the error correction bits, and then delivers the decoded signals to a further stage as the data on the available k channels $CH_1$ to $CH_k$. In this case, since the frame synchronization is performed at both of the transmitting-end station 101 and the receiving-end station 102, a phase alignment unit can be dispensed with.

A number of the reserved channels capable of being used as the channels for transmitting the error correction bits may be changed due to a modification of a configuration of the optical transmission system. Advantageously, according to the sixth embodiment of the present invention, the encoder 104 may be adapted so as to perform the appropriate coding depending on numbers of the available channels and the reserved channels. Alternatively, if the number of the reserved channels decreases to one, then the reserved channel may be used for a parity bit. In this case, the optical transmission system can be reconstructed so as to perform an error correction by specifying a bit position where a transmission error occurs by means of monitoring bytes B1 and B2 within an SOH of an STM-N, as earlier described.

Figure 11:
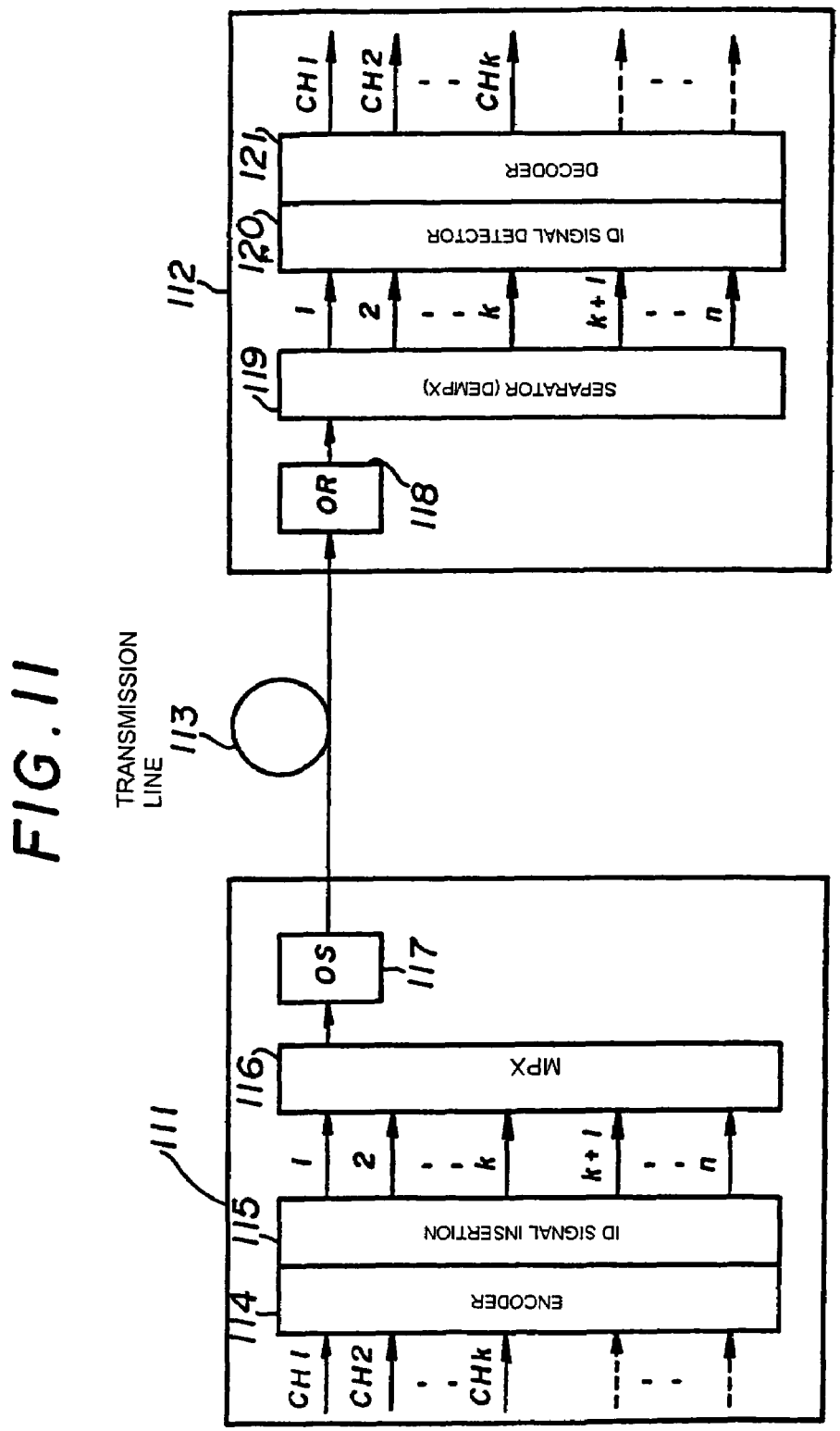
FIG. 11 is a schematic diagram of an optical transmission system according to a seventh embodiment of the present invention.

FIG. 11 is a schematic diagram of an optical transmission system according to a seventh embodiment of the present invention. The optical transmission system comprises a transmitting-end station 111, a receiving-end station 112 and an optical transmission line 113 connecting the transmitting-end station 111 and the receiving-end station 112.

The transmitting-end station 111 includes an encoder 114, an identification ("ID") signal-inserting unit 115, a multiplexing unit 116 and an electrical-optical converter (OS)117. The receiving-end station 112, includes an optical-electrical converter (OR) 118, a separator 119, an identification ("ID") signal detector 120 and a decoder 121.

We consider a similar environment to that of FIG. 10 where there are n channels $CH_1$ to $CH_n$ comprising k channels $CH_i$ to $CH_k$ used for transmitting data and other (n–k) channels $CH_{k+1}$ to $CH_n$ reserved for future. However, in the seventh embodiment, a coding is performed using any m channels selected from the effective k channels. For example, the encoder 114 may perform a (n+m−k, m) Hamming coding. An example of a set of these variables is n=9, k=6 and m=4. Then, the encoder 114 performs the (7, 4) Hamming coding.

With respect to other effective channels rather than the channels used for the Hamming coding, the data on these channels are passed through the encoder 114 and the identification signal-inserting unit 115 without being affected.

The data on the m channels to be encoded are marked with an identification signal, inserted by the identification signal-inserting unit 115, which specifies an order of coding. The identification signal may be inserted into a control field located at a top of a frame from the channel to be error correction coded or a J1 byte within a line over head contained in a payload for an STM-N frame.

The multiplexing unit 116 time-division multiplexes the k data on the k channels $CH_1$ to $CH_k$ and the generated (n−k) error correction bits. In this case, the bits 1 to k and the bits (k+1) to n are multiplexed as the channels 1 to n, as shown in FIG. 11. The time-division-multiplexed signals are then provided to the electrical-optical converter 117 and converted to optical signals so as to be delivered to the optical transmission line 113.

At the receiving-end station 112, the optical-electrical converter 118 receives the multiplexed optical signals from the optical transmission line 113 and converts the received optical signals to electrical signals. The electrical signals are passed to the separator 119, where the electrical signals that have been time-division multiplexed are separated into n signals corresponding to the n channels, respectively. The separated n signals are supplied to the identification signal detector 120. The identification signal detector 120 detects the identification signals added by the identification signal-inserting unit 115 at the transmitting-end station 111 from the separated n signals in order to determine the signals to be decoded. The signals, which do not include the identification signal, are directly passed through the decoder 121 to a further stage. The other signals containing the identification signal are transferred to the decoder 121. The decoder 121 receives the signals to be decoded in accordance with the order specified by the identification signal and performs the error correction decoding.

Therefore, according to the seventh embodiment of the present invention, advantageously, the error correction coding can be applied to very significant channels selected from the effective channels, even if a number of the effective channels is considerably high.

Figure 12:
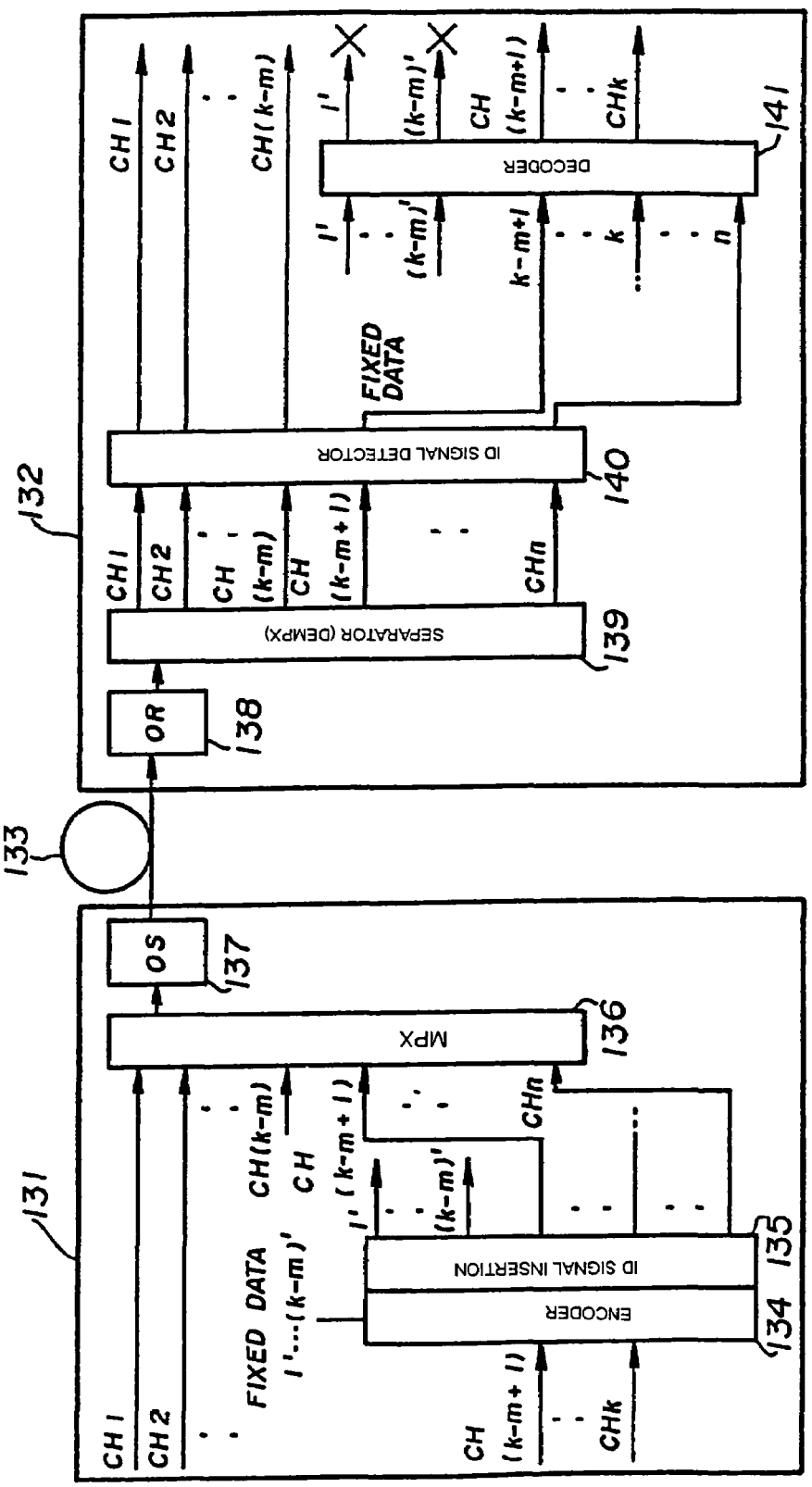
FIG. 12 is a schematic diagram of an optical transmission system according to an eighth embodiment of the present invention.

FIG. 12 is a schematic diagram of an optical transmission system according to an eighth embodiment of the present invention. The optical transmission system comprises a transmitting-end station 131, a receiving-end station 132 and an optical transmission line 133 connecting the transmitting-end station 131 and the receiving-end station 132.

The transmitting-end station 131 includes an encoder 134, an identification signal-inserting unit 135, a multiplexing unit 136 and an electrical-optical converter (OS) 137. The receiving-end station 132 includes an optical-electrical converter (OR) 138, a separator 139, an identification signal detector 140 and a decoder 141.

At the transmitting-end station 131 the multiplexing unit 136 is operable to time-division multiplex n channels and the separator 139 at the receiving-end station 132 is operable to separate the time-division-multiplexed channels into n channels. We consider that any m (<k) channels selected from the n channels are subject to an error correction coding, and that (k−m) channels are used for fixed data to be error correction coded by the encoder 134. For example, (k−m) data on the channels $CH_1$ to $CH_{(k-m)}$ are input to the multiplexing unit 136, data on the channels $CH_{(k-m+1)}$ to $CH_k$ are input to the encoder 134 and the fixed data 1' to (k−m)' corresponding to the channels $CH_1$ to $CH_{(k-m)}$ are input to the encoder 134. In this manner, the encoder 134 performs, for example, a (n, k) Hamming coding on the basis of the k data comprising m data on the channels and the (k−m) fixed data.

As a result, the encoder 134 outputs the (k−m) fixed data 1' to (k−m)', the m data on the channels $CH_{(k-m+1)}$ to $CH_k$ and (n−k) error correction bits. Among the output data from the encoder 134, the m data corresponding to the channels $CH_{(k-m+1)}$ to $CH_k$ and the (n−k) error correction bits, (k+1) to n bits, are used in the identification signal-inserting unit 135, such that the identification signal is inserted into each data. The m data corresponding to the channels $CH_{(k-m+1)}$ to $CH_k$ and the (n−k) error correction bits are sent to the multiplexing unit 136 together with their identification signal. Then, the multiplexing unit 136 receives and time-division multiplexes the n data consisting of the (k−m) data on the channels $CH_1$ to $CH_{(k-m)}$, m data corresponding to the channels $CH_{(k-m+1)}$ to $CH_k$ and the (n−k) error correction bits. The time-division-multiplexed signals are transferred to the electrical-optical converter 137 so as to be converted to optical signals and delivered to the receiving-end station 132 via the optical transmission line 133.

At the receiving-end station 132, the optical-electrical converter 138 receives and converts the multiplexed optical signals to electrical signals. The electrical signals are sent to the separator 139 by which the electrical signals are separated into signals corresponding to channels $CH_1$ to $CH_n$, and, thereafter, transferred to the identification signal detector 140. The identification signal detector 140 detects the identification signals attached to the data at the transmitting-end station 131 and provides the data corresponding to the detected identification signals to the decoder 141 according to the order specified by the identification signal. The other data without specified by the identification signal are directly passed to a further stage without being decoded, because they have not been subject to the error correction coding. The decoder 141 receives the data from the identification signal detector 140, that is to say, the data on the channels $CH_{(k-m+1)}$ to $CH_n$ being subject to the error correction coding at the transmitting-end station 131 as well as the same fixed data 1' to (k−m)' as input to the encoder 134. Subsequently, the decoder 141 performs an error correction decoding and outputs the error corrected data on the channels $CH_{(k-m+1)}$ to $CH_n$.

According to the eighth embodiment of the present invention, it is advantageous that a high quality transmission can be achieved for any channels within the transmission system by effectively making use of reserved channels. Obviously, the coding scheme employed in the encoder 134 should not be limited to the above-mentioned Hamming coding, but any suitable error correction schemes can be applied to the transmission system. Of course, the decoder 141 at the receiving-end station 132 should be constructed so as to be adapted to the coding scheme implemented by the encoder 134.

Figure 13:
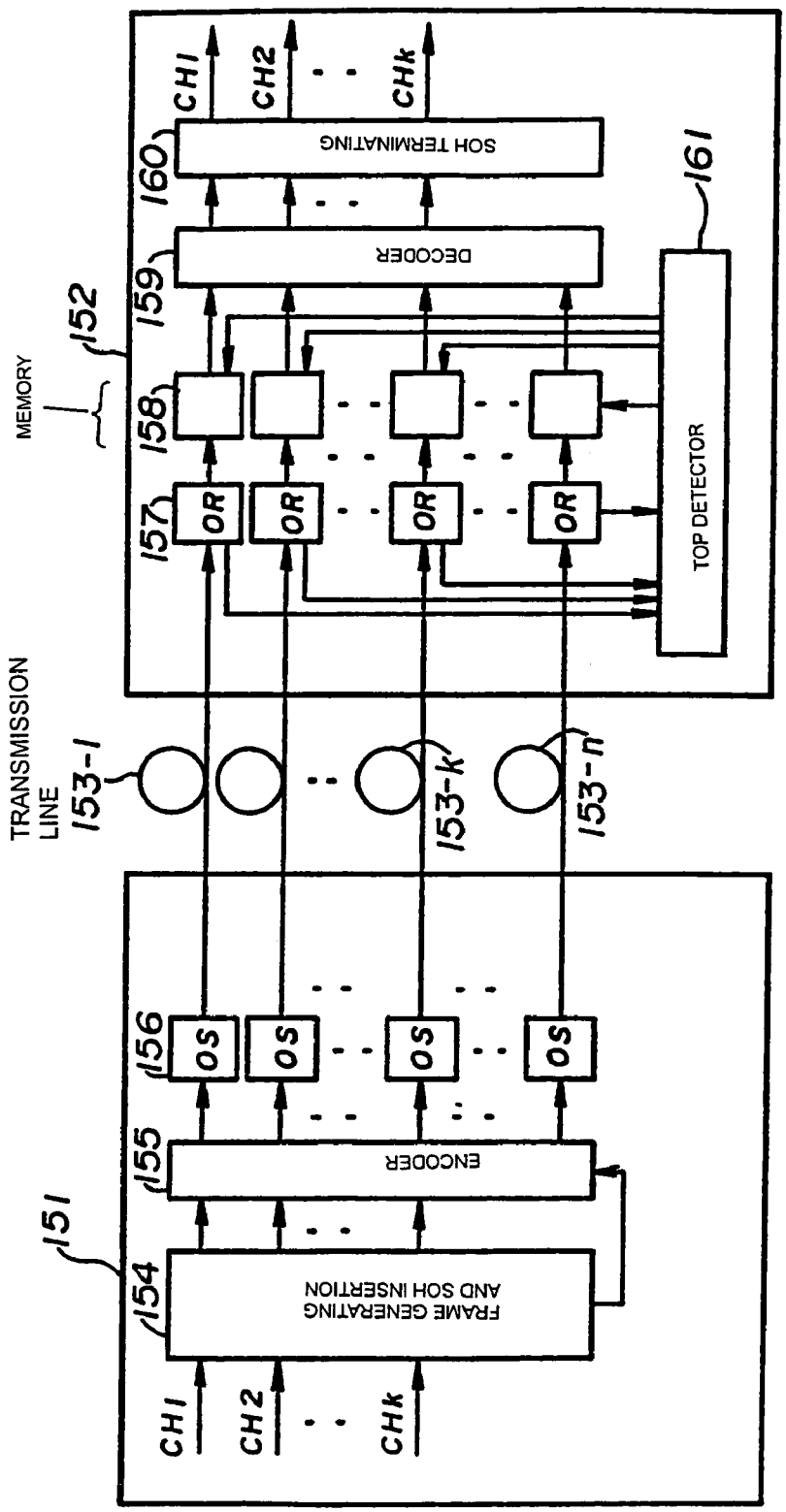
FIG. 13 is a schematic diagram of an optical transmission system according to a ninth embodiment of the present invention.

FIG. 13 is a schematic diagram of an optical transmission system according to a ninth embodiment of the present invention. The optical transmission system comprises a transmitting-end station 151, a receiving-end station 152 and optical transmission lines 153-1 to 153-n connecting the transmitting-end station 151 and the receiving-end station 152.

The transmitting-end station 151 includes a frame-generating and SOH-inserting unit 154, an encoder 155 and an electrical-optical converter (OS) 156. The receiving-end station 152 includes an optical-electrical converter (OR) 157, a memory unit 158, a decoder 159, an SOH terminating unit 160 and a frame number and top detector 161.

The optical transmission system according to the ninth embodiment is similar to that of FIG. 7, except for optical signals not being multiplexed. As shown in FIG. 13, the optical signals are transmitted through the plurality of the optical transmission lines 153-1 to 153-n, which correspond to channels $CH_1$ to $CH_n$ and transmit the data on the channels $CH_1$ to $CH_n$ with error correction bits. The frame-generating and SOH-inserting unit 154 is operable to add an SOH to each of the channels $CH_1$ to $CH_n$ concurrently at the same timing and insert each frame number to a reserved byte within each SOH. Alternatively, each frame number may be inserted into a J1 byte within a line overhead in a virtual container. In any cases, the data on the channels $CH_1$ to $CH_k$, i.e. primary signals, are input to the encoder 155 in phase.

As an example, it is assumed that the encoder 155 performs a (n, k) Hamming coding, that a frame synchronization byte within each SOH is not encoded, and that the frame synchronization byte is added to each sequence of error correction bits. In this case, the frame synchronization byte is attached to every one of the sequences 1 to n and the sequences are applied to the electrical-optical converter 156. The electrical-optical converter 156 converts the n sequences to n optical signals and transmits the n optical signals to the receiving-end station 152 through the optical transmission lines 153-1 to 153-n, respectively.

At the receiving-end station 152, the optical-electrical converter 157 converts the received n optical signals to electrical signals and provides the converted electrical signals to the frame number and top detector 161 and the memory unit 158.

The frame number and top detector 161 detects the number and top of each frame formed by the optical signals delivered from the optical transmission lines 153-1 to 153-n regardless of differences of wavelengths or characteristics between the optical signals. Then, the frame number and top detector 161 can matches a phase of any bits directed to the decoder 159 with each other by controlling a read out timing of the bits from the memory unit 158. Consequently, the decoder 159 can receive all the n bits in phase and perform an error correction process in conformity with the error correction coding implemented at the transmitting-end station 151. Thereafter, the SOH terminating unit 160 receives the frames and terminates the SOH within each frame so as to transfer the frames, i.e., the data on the channels $CH_1$ to $CH_k$ to a further stage, not shown in FIG. 13.

Further, the present invention is not limited to these embodiments, but variations and modifications may be made without departing from the scope of the present invention. For example, any suitable coding scheme, such as error correction codes, cyclic codes, BCH (Bose-Chaudhuri-Hocquenghem) codes, Fire code, and so on, can be applied to the present invention as the coding scheme. In addition, an encoder and a decoder as well as a parity generator and a parity detector, as described in the embodiments and illustrated in the drawings, may be constructed using an optical logic circuit such that an error correction coding and decoding, as well as, a parity generating and detecting can be directly applied to the optical signals. In this case, since those logical operations applied to the optical signals are implemented based on an amplitude modulation for the optical signals, the error correction and parity operations can be applied to the optical signals with different wavelengths by simply introducing a wavelength conversion.

It can be summarized that according to the present invention, a transmitting-end optical transmission device or station is operable to form k data by aligning phases of data on k channels with each other and for generating (n−k) error correction bits for the k data and adding said (n−k) error correction bits to the k data, convert both the k data and the (n−k) error correction bits to n optical signals having different wavelengths and for wavelength-multiplex the n optical signals so as to be delivered to the optical transmission line. A receiving-end optical transmission device or station is operable to separate the wavelength-multiplexed optical signals from the optical transmission line into n optical signals, each corresponding to one of the different wavelengths, and generates k error corrected data by correcting error bits using the (n−k) error correction bits contained in the n separated optical signals. It is advantageous that a high quality transmission can be achieved without increasing a transmission rate for the k transmission data forming primary signals. Also, the present invention provides an advantage that the high quality transmission can be achieved without occupying reserved bytes within an SOH when it is applied to a SDH transmission.

According to another aspect of the present invention, an optical transmission system is characterized in that a transmitting-end optical transmission device or a station is operable to form data by adding an SOH (Section Over Head) including at least one error monitoring byte to data on k channels and aligning phases of the data with each other and generate a parity bit for the k data and adding the parity bit to said k data. The transmitting-end optical transmission device is also operable to convert the k data and the parity bit to (k+1) optical signals having different wavelengths and wavelength-multiplex the (k+1) optical signals so as to be delivered to the optical transmission line. The receiving-end optical transmission device or station is operable to separate the wavelength-multiplexed optical signals from the optical transmission line into (k+1) optical signals, each corresponding to one of the different wavelengths, and, to correct error bits based on one result of a parity check for the separated (k+1) optical signals and the other result of a parity check using the at least one error monitoring byte within the SOH. In this case, a bit position where an erroneous bit locates is determined by the parity checks and the erroneous bit is subject to an error correction. Therefore, it is advantageous that the high quality transmission can be achieved very economically and simply by utilizing the error monitoring bytes in the SOH used for SDH and adding few parity bits.

It should be noted that the present invention could be applied to TDM transmission. Assuming that a transmission data corresponding to one channel is t be transmitted. In this case, a transmitting-end optical transmission device or station comprises an encoder having k input and n outputs, for generating (n−k) error correction bits for every transmission data having k bits, and, a wavelength-multiplexing unit connected to the encoding means, for converting the transmission data and the (n−k) error correction bits to n optical signals having different wavelengths and for wavelength-multiplexing the n optical signals so as to be delivered to the optical transmission line. A receiving-end optical transmission device or station comprises a wavelength-demultiplexing unit for separating the wavelength-multiplexed optical signals from the optical transmission line into n optical signals, each corresponding to one of the different wavelengths and decoder connected to the wavelength-multiplexing means, for correcting error bits of data having k bits contained in the n separated optical signals by using the (n–k) error correction bits contained in the n separated optical signals. Therefore, advantageously, a high quality transmission can be achieved by transmitting error correction bits without adversely affecting a transmission rate for primary signals at a transmitting-end and by performing error correction at a receiving-end.

Furthermore, according to the present invention, when data conveyed on n channels are transmitted after time-division multiplexed, error correction bits may be transmitted by means of reserved channels and a number of the channels used for error correcting coding may not be constrained. Therefore, the present invention provides an advantage that an error correction coding on data for particularly significant channels can be always implemented even if the number of the reserved channels are much reduced.

The present application is based on Japanese priority application No. 10-138556 filed on May 20, 1998, the entire contents of which are hereby incorporated by reference.

What is claimed is:

1. An optical transmission system comprising a transmitting-end optical transmission device, a receiving-end optical transmission device and an optical transmission line connecting the transmitting-end and receiving-end optical transmission devices,
   the transmitting-end optical transmission device comprising:
   encoding means having k input and n output, for generating (n–k) error correction bits for transmission data on k channels and adding the (n–k) error correction bits to the transmission data so as to form a sequence of n data;
   multiplexing and frame generating means connected to the encoding means, for adding a frame synchronization information to each data in the sequence of the n data and time-division-multiplexing the n data; and
   electrical-optical converting means connected to the multiplexing and frame generating means, for converting the time-division-multiplexed n data into n optical signals so as to deliver the n optical signals to the optical transmission line, and
   the receiving-end optical transmission device comprising:
   optical-electrical converting means for converting the n optical signals via the optical transmission line to electrical signals;
   separating means connected to the optical-electrical converting means, for separating the electrical signals into a sequence of n data by detecting the frame synchronization information; and
   decoding means connected to the separating means, for performing error correction decoding for a sequence of k data from said separated sequence of the n data using a sequence of (n–k) data from said separated sequence of the n data.

2. An optical transmission device comprising:
   frame generating and SOH inserting means for adding an SOH (Section Over Head) to data for each of k channels such that all the k data can be aligned in phase by means of a frame synchronization byte within each SOH;
   encoding means having n outputs and connected to the frame generating and SOH inserting means, for receiving the k data with the SOH, generating (n–k) error correction bits for the k data without taking the frame synchronization bytes into account, adding a frame synchronization byte to each of the (n–k) error correction bits and forming n data, each of the n data including its frame synchronization byte, by combining the (n–k) error correction bits and the k data corresponding to the k channels;
   electrical-optical means for converting the n data from the encoding means into n optical signals having different wavelengths; and
   wavelength-multiplexing means connected to the electrical-optical converting means, for multiplexing the n optical signals from the electrical-optical converting means so as to form wavelength-multiplexed signals.

3. An optical transmission device comprising:
   wavelength-demultiplexing means for separating wavelength-multiplexed optical signals having n wavelengths into n optical signals corresponding to the n wavelengths;
   optical-electrical converting means connected to the wavelength-demultiplexing means, for receiving and converting the separated n optical signals corresponding to the n wavelengths into n electrical signals;
   frame top detecting means for detecting a top of a frame for each of the n electrical signals converted by the optical-electrical converting means;
   memory means for storing the n electrical signals converted by the optical-electrical converting means and outputting the stored n electrical signals such that the tops of the frames detected by the frame top detecting means are aligned with each other;
   decoding means for performing an error correction decoding for k data contained in the n electrical signals converted by the optical-electrical converting means using (n–k) error correction bits contained in said n electrical signals; and
   SOH (Section Over Head) terminating means for receiving the k data from the decoding means and terminating an SOH for said every k data.

4. An optical transmission device, comprising:
   wavelength-demultiplexing means for separating wavelength-multiplexed optical signals conveying n bits into a first optical signal having a first wavelength conveying k bits representing transmission data and a second optical signal having a second wavelength, different from the first wavelength, conveying (n–k) bits representing error correction bits;
   optical-electrical converting means for converting the optical signals having the respective, different wavelengths to electrical signals including said k bits representing transmission data;
   decoding means receiving the electrical signals from the optical-electrical converting means, for performing error correction decoding for every said k bits using said (n–k) bits representing error correction bits.

5. An optical transmission device that multiplexes n channels, wherein (n–k) channels are not used for data transmission in the optical transmission device, comprising:
   encoding means having k inputs and n outputs, for generating (n–k) error correction bits for transmission data on k channels and adding the (n–k) error correction bits to the transmission data so as to form a sequence of n data;
   multiplexing and frame generating means connected to the encoding means, for adding a frame synchronization information to each data in the sequence of the n data and time-division-multiplexing the n data; and
   electrical-optical converting means connected to the multiplexing and frame generating means, for converting the time-division-multiplexed n data into n optical signals so as to deliver the n optical signals to an optical transmission line.

6. An optical transmission device that separates n channels, wherein (n–k) channels are not used for data transmission in the optical transmission device, comprising:
- optical-electrical converting means for converting time-division-multiplexed signals to electrical signals;
- separating means connected to the optical-electrical converting means, for separating the electrical signals into a sequence of n data including k bits representing transmission data and (n–k) bits representing error correction bits by detecting a frame synchronization information; and
- decoding means connected to the separating means, for performing error correction decoding for every said k bits using said (n–k) error correction bits.

7. An optical transmission device having n channels, comprising:
- encoding means for generating error correction bits for m data corresponding to any m channels of k channels representing transmission data, k being less than n and a number of the error correction bits being (n–k);
- identification signal inserting means connected to the encoding means, for inserting an identification signal into each of the m data and the (n–k) error correction bits from the encoding means;
- multiplexing means connected to the identification signal inserting means, for timedivision-multiplexing (k–m) data rather than said m data in the transmission data, and, said m data as well as said (n–k) error correction bits; and
- electrical-optical converting means for receiving from the multiplexing means and converting the time-division-multiplexed signals to optical signals.

8. An optical transmission device having n channels, comprising:
- optical-electrical converting means for converting time-division-multiplexed signals including k data representing transmission data for k channels in the n channels and (n–k) error correction bits to n electrical signals;
- separating means for separating the n electrical signals receiving from the optical-electrical converting means into a sequence of n data;
- identification signal detecting means for detecting m data and the (n–k) error correction bits in the sequence of the n data received from the separating means, each of the m data and the (n–k) error correction bits having an identification signal; and
- decoding means receiving the k data and the (n–k) error correction bits from the identification signal detecting means, for performing error correction decoding on the m data using the (n–k) error correction bits.

9. An optical transmission device having n channels, comprising:
- encoding means receiving m data corresponding to any m channels of k channels representing transmission data and (k–m) fixed data, for generating (n–k) error correction, k being less than n;
- identification signal inserting means connected to the encoding means, for inserting an identification signal into each of the m data and the (n–k) error correction bits;
- multiplexing means connected to the identification signal inserting means, for time-division-multiplexing (k–m) data rather than said m data in the transmission data, and, said m data as well as said (n–k) error correction bits; and
- electrical-optical converting means for receiving from the multiplexing means and converting the time-division-multiplexed signals to optical signals.

10. An optical transmission device having n channels, comprising:
- optical-electrical converting means for converting time-division-multiplexed signals including k data representing transmission data for k channels in the n channels and (n–k) error correction bits to n electrical signals;
- separating means for separating the n electrical signals receiving from the optical-electrical converting means into a sequence of n data;
- identification signal detecting means for detecting m data and the (n–k) error correction bits in the sequence of the n data received from the separating means, each of the m data and the (n–k) error correction bits having an identification signal; and
- decoding means receiving the m data as well as the (n–k) error correction bits from the identification signal detecting means and (k–m) fixed data, for performing error correction decoding on the m data using the (n–k) error correction bits.

11. An optical transmission device comprising:
- frame generating and SOH inserting means for adding an SOH (Section Over Head) to data for each of k channels such that all the k data can be aligned in phase by means of a frame synchronization byte within each SOH;
- encoding means having n outputs and connected to the frame generating and SOH inserting means, for receiving the k data with the SOH, generating (n–k) error correction bits for the k data without taking the frame synchronization bytes into account, adding a frame synchronization byte to each of the (n–k) error correction bits and forming n data, each of the n data including its frame synchronization byte, by combining the (n–k) error correction bits and the k data corresponding to the k channels; and
- electrical-optical converting means for converting the n data from the encoding means into n optical signals having different wavelengths.

12. An optical transmission device comprising:
- optical-electrical converting means for converting n optical signals corresponding to n wavelengths into n electrical signals;
- frame top detecting means for detecting a top of a frame for each of the n electrical signals converted by the optical-electrical converting means;
- memory means for storing the n electrical signals converted by the optical-electrical converting means and outputting the stored n electrical signals such that the tops of the frames detected by the frame top detecting means are aligned with each other;
- decoding means for performing an error correction decoding for k data contained in the n electrical signals converted by the optical-electrical converting means using (n–k) error correction bits contained in said n electrical signals; and
- SOH (Section Over Head) terminating means for receiving the k data from the decoding means and terminating an SOH for said every k data.

* * * * *

UNITED STATES PATENT AND TRADEMARK OFFICE
CERTIFICATE OF CORRECTION

| | | |
|---|---|---|
| PATENT NO. | : 7,113,703 B2 | Page 1 of 1 |
| APPLICATION NO. | : 10/615978 | |
| DATED | : September 26, 2006 | |
| INVENTOR(S) | : Kazuhisa Murata | |

It is certified that error appears in the above-identified patent and that said Letters Patent is hereby corrected as shown below:

Column 23, Line 25 change "timedivision-multiplexing" to --time-division-multiplexing--

Signed and Sealed this

Twenty-seventh Day of March, 2007

JON W. DUDAS
*Director of the United States Patent and Trademark Office*